United States Patent
Palmer et al.

(10) Patent No.: US 9,594,371 B1
(45) Date of Patent: *Mar. 14, 2017

(54) SYSTEM AND METHOD TO DETECT EXECUTION OF DRIVING MANEUVERS

(71) Applicant: SmartDrive Systems, Inc., San Diego, CA (US)

(72) Inventors: Jason Palmer, Carlsbad, CA (US); Slaven Sljivar, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,744

(22) Filed: Sep. 15, 2014

Related U.S. Application Data

(63) Continuation of application No. 14/186,416, filed on Feb. 21, 2014, now Pat. No. 8,892,310.

(51) Int. Cl.
*G08G 1/00* (2006.01)
*G05D 1/00* (2006.01)
*G05D 1/02* (2006.01)

(52) U.S. Cl.
CPC ............. *G05D 1/00* (2013.01); *G05D 1/0055* (2013.01); *G05D 1/021* (2013.01)

(58) Field of Classification Search
CPC .......... G08G 1/16; G08G 1/161; G08G 1/165; G08G 1/166; G08G 1/167; G01C 21/00; G01C 21/005; G01C 21/04; G01C 21/10; G01C 21/20; G01C 21/26; G01C 21/28; G01C 21/3461; G01C 21/3492; G05D 1/005; G05D 1/021

(Continued)

(56) References Cited

U.S. PATENT DOCUMENTS 673,203 A  4/1901  Freund
673,795 A  5/1901  Hammer
(Continued)

FOREIGN PATENT DOCUMENTS

CA  2469728    12/2005
CA  2469728 A1  12/2005
(Continued)

OTHER PUBLICATIONS

Adaptec published and sold its VideoOh! DVD software USB 2.0 Edition in at least Jan. 24, 2003.

(Continued)

*Primary Examiner* — Richard Camby
(74) *Attorney, Agent, or Firm* — Sheppard Mullin Richter & Hampton LLP

(57) ABSTRACT

This disclosure relates to a system and method for detecting execution of driving maneuvers based on pre-determined driving maneuver profiles. Some or all of the system may be installed in a vehicle and/or be otherwise coupled with a vehicle. In some implementations, the system may detect execution of driving maneuvers by the vehicle based on pre-determined driving maneuver profiles. The system may include one or more sensors configured to generate output signals conveying information related to the vehicle. In some implementations, the system may detect execution of the driving maneuvers by the vehicle based on a comparison of the information conveyed by the output signals from the sensors to criteria included in the pre-determined driving maneuver profiles.

23 Claims, 4 Drawing Sheets

(58) Field of Classification Search
USPC ..... 701/1, 300, 301, 41–44, 70, 93, 96, 101, 701/409, 410, 412, 468
See application file for complete search history.

(56) References Cited

U.S. PATENT DOCUMENTS

| | | | |
|---|---|---|---|
| 673,907 A | 5/1901 | Johnson |
| 676,075 A | 6/1901 | McDougall |
| 679,511 A | 7/1901 | Richards |
| 681,036 A | 8/1901 | Burg |
| 681,283 A | 8/1901 | Waynick |
| 681,998 A | 9/1901 | Swift |
| 683,155 A | 9/1901 | Thompson |
| 683,214 A | 9/1901 | Mansfield |
| 684,276 A | 10/1901 | Lonergan |
| 685,082 A | 10/1901 | Wood |
| 685,969 A | 11/1901 | Campbell |
| 686,545 A | 11/1901 | Selph |
| 689,849 A | 12/1901 | Brown |
| 691,982 A | 1/1902 | Sturgis |
| 692,834 A | 2/1902 | Davis |
| 694,781 A | 3/1902 | Prinz |
| 2,943,141 A | 6/1960 | Knight |
| 3,634,866 A | 1/1972 | Meyer |
| 3,781,824 A | 12/1973 | Caiati |
| 3,812,287 A | 5/1974 | Lemelson |
| 3,885,090 A | 5/1975 | Rosenbaum |
| 3,992,656 A | 11/1976 | Joy |
| 4,054,752 A | 10/1977 | Dennis |
| 4,072,850 A | 2/1978 | McGlynn |
| 4,258,421 A | 3/1981 | Juhasz |
| 4,271,358 A | 6/1981 | Schwarz |
| 4,276,609 A | 6/1981 | Patel |
| 4,280,151 A | 7/1981 | Tsunekawa |
| 4,281,354 A | 7/1981 | Conte |
| 4,401,976 A | 8/1983 | Stadelmayr |
| 4,409,670 A | 10/1983 | Herndon |
| 4,420,773 A | 12/1983 | Toyoda |
| 4,425,097 A | 1/1984 | Owens |
| 4,456,931 A | 6/1984 | Toyoda |
| 4,489,351 A | 12/1984 | d'Alayer de Costemore d'Arc |
| 4,496,995 A | 1/1985 | Colles |
| 4,500,868 A | 2/1985 | Tokitsu |
| 4,528,547 A | 7/1985 | Rodney |
| 4,533,962 A | 8/1985 | Decker |
| 4,558,379 A | 12/1985 | Huetter |
| 4,588,267 A | 5/1986 | Pastore |
| 4,593,313 A | 6/1986 | Nagasaki |
| 4,621,335 A | 11/1986 | Bluish |
| 4,625,210 A | 11/1986 | Sagl |
| 4,630,110 A | 12/1986 | Cotton |
| 4,632,348 A | 12/1986 | Keesling |
| 4,638,289 A | 1/1987 | Zottnik |
| 4,646,241 A | 2/1987 | Ratchford |
| 4,651,143 A | 3/1987 | Yamanaka |
| 4,671,111 A | 6/1987 | Lemelson |
| 4,718,685 A | 1/1988 | Kawabe |
| 4,754,255 A | 6/1988 | Sanders |
| 4,758,888 A | 7/1988 | Lapidot |
| 4,763,745 A | 8/1988 | Eto |
| 4,785,474 A | 11/1988 | Bernstein |
| 4,789,904 A | 12/1988 | Peterson |
| 4,794,566 A | 12/1988 | Richards |
| 4,804,937 A | 2/1989 | Barbiaux |
| 4,806,931 A | 2/1989 | Nelson |
| 4,807,096 A | 2/1989 | Skogler |
| 4,814,896 A | 3/1989 | Heitzman |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,853,856 A | 8/1989 | Hanway |
| 4,853,859 A | 8/1989 | Morita |
| 4,866,616 A | 9/1989 | Takeuchi |
| 4,876,597 A | 10/1989 | Roy |
| 4,883,349 A | 11/1989 | Mittelhaeuser |
| 4,896,855 A | 1/1990 | Furnish |
| 4,926,331 A | 5/1990 | Windle |
| 4,930,742 A | 6/1990 | Schofield |
| 4,936,533 A | 6/1990 | Adams |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente |
| 4,992,943 A | 2/1991 | McCracken |
| 4,993,068 A | 2/1991 | Piosenka |
| 4,995,086 A | 2/1991 | Lilley |
| 5,012,335 A | 4/1991 | Cohodar |
| 5,027,104 A | 6/1991 | Reid |
| 5,046,007 A | 9/1991 | McCrery |
| 5,050,166 A | 9/1991 | Cantoni |
| 5,056,056 A | 10/1991 | Gustin |
| 5,057,820 A | 10/1991 | Markson |
| 5,096,287 A | 3/1992 | Kakinami |
| 5,100,095 A | 3/1992 | Haan |
| 5,111,289 A | 5/1992 | Lucas |
| 5,140,434 A | 8/1992 | Van Blessinger |
| 5,140,436 A | 8/1992 | Blessinger |
| 5,140,438 A | 8/1992 | Kurahashi |
| 5,144,661 A | 9/1992 | Shamosh |
| 5,178,448 A | 1/1993 | Adams |
| 5,185,700 A | 2/1993 | Bezos |
| 5,196,938 A | 3/1993 | Blessinger |
| 5,223,844 A | 6/1993 | Mansell |
| 5,224,211 A | 6/1993 | Roe |
| 5,262,813 A | 11/1993 | Scharton |
| 5,283,433 A | 2/1994 | Tsien |
| 5,294,978 A | 3/1994 | Katayama |
| 5,305,214 A | 4/1994 | Komatsu |
| 5,305,216 A | 4/1994 | Okura |
| 5,308,247 A | 5/1994 | Dyrdek |
| 5,309,485 A | 5/1994 | Chao |
| 5,311,197 A | 5/1994 | Sorden |
| 5,321,753 A | 6/1994 | Gritton |
| 5,327,288 A | 7/1994 | Wellington |
| 5,330,149 A | 7/1994 | Haan |
| 5,343,527 A | 8/1994 | Moore |
| 5,353,023 A | 10/1994 | Mitsugi |
| 5,361,326 A | 11/1994 | Aparicio |
| 5,387,926 A | 2/1995 | Bellan |
| 5,388,045 A | 2/1995 | Kamiya |
| 5,388,208 A | 2/1995 | Weingartner |
| 5,404,330 A | 4/1995 | Lee |
| 5,408,330 A | 4/1995 | Squicciarini |
| 5,422,543 A | 6/1995 | Weinberg |
| 5,430,431 A | 7/1995 | Nelson |
| 5,430,432 A | 7/1995 | Camhi |
| 5,435,184 A | 7/1995 | Pineroli |
| 5,445,024 A | 8/1995 | Riley |
| 5,445,027 A | 8/1995 | Zoerner |
| 5,446,659 A | 8/1995 | Yamawaki |
| 5,455,625 A | 10/1995 | Englander |
| 5,455,716 A | 10/1995 | Suman |
| 5,465,079 A | 11/1995 | Bouchard |
| 5,473,729 A | 12/1995 | Bryant |
| 5,477,141 A | 12/1995 | Naether |
| 5,495,242 A | 2/1996 | Kick |
| 5,495,243 A | 2/1996 | McKenna |
| 5,497,419 A | 3/1996 | Hill |
| 5,499,182 A | 3/1996 | Ousborne |
| 5,504,482 A | 4/1996 | Schreder |
| 5,513,011 A | 4/1996 | Matsumoto |
| 5,515,285 A | 5/1996 | Garrett |
| 5,519,260 A | 5/1996 | Washington |
| 5,521,633 A | 5/1996 | Nakajima |
| 5,523,811 A | 6/1996 | Wada |
| 5,526,269 A | 6/1996 | Ishibashi |
| 5,530,420 A | 6/1996 | Tsuchiya |
| 5,532,678 A | 7/1996 | Kin |
| 5,537,156 A | 7/1996 | Katayama |
| 5,539,454 A | 7/1996 | Williams |
| 5,541,590 A | 7/1996 | Nishio |

(56) References Cited

U.S. PATENT DOCUMENTS

| | | |
|---|---|---|
| 5,544,060 A | 8/1996 | Fujii |
| 5,546,191 A | 8/1996 | Hibi |
| 5,546,305 A | 8/1996 | Kondo |
| 5,548,273 A | 8/1996 | Nicol |
| 5,552,990 A | 9/1996 | Ihara |
| 5,559,496 A | 9/1996 | Dubats |
| 5,568,211 A | 10/1996 | Bamford |
| 5,570,087 A | 10/1996 | Lemelson |
| 5,570,127 A | 10/1996 | Schmidt |
| 5,574,424 A | 11/1996 | Nguyen |
| 5,574,443 A | 11/1996 | Hsieh |
| D376,571 S | 12/1996 | Kokat |
| 5,581,464 A | 12/1996 | Woll |
| 5,586,130 A | 12/1996 | Doyle |
| 5,590,948 A | 1/1997 | Moreno |
| 5,596,382 A | 1/1997 | Bamford |
| 5,596,647 A | 1/1997 | Wakai |
| 5,600,775 A | 2/1997 | King |
| 5,608,272 A | 3/1997 | Tanguay |
| 5,610,580 A | 3/1997 | Lai |
| 5,612,686 A | 3/1997 | Takano |
| 5,631,638 A | 5/1997 | Kaspar |
| 5,638,273 A | 6/1997 | Coiner |
| 5,642,106 A | 6/1997 | Hancock |
| 5,646,856 A | 7/1997 | Kaesser |
| 5,652,706 A | 7/1997 | Morimoto |
| RE35,590 E | 8/1997 | Bezos |
| 5,654,892 A | 8/1997 | Fujii |
| 5,659,355 A | 8/1997 | Barron |
| 5,666,120 A | 9/1997 | Kline |
| 5,667,176 A | 9/1997 | Zamarripa |
| 5,669,698 A | 9/1997 | Veldman |
| 5,671,451 A | 9/1997 | Takahashi |
| 5,677,979 A | 10/1997 | Squicciarini |
| 5,680,117 A | 10/1997 | Arai |
| 5,680,123 A | 10/1997 | Lee |
| 5,686,765 A | 11/1997 | Washington |
| 5,686,889 A | 11/1997 | Hillis |
| 5,689,442 A | 11/1997 | Swanson |
| 5,696,705 A | 12/1997 | Zykan |
| 5,706,362 A | 1/1998 | Yabe |
| 5,706,909 A | 1/1998 | Bevins |
| 5,712,679 A | 1/1998 | Coles |
| 5,717,456 A | 2/1998 | Rudt |
| 5,719,554 A | 2/1998 | Gagnon |
| 5,758,299 A | 5/1998 | Sandborg |
| 5,781,101 A | 7/1998 | Stephen |
| 5,781,145 A | 7/1998 | Williams |
| 5,784,007 A | 7/1998 | Pepper |
| 5,784,021 A | 7/1998 | Oliva |
| 5,784,521 A | 7/1998 | Nakatani |
| 5,790,403 A | 8/1998 | Nakayama |
| 5,790,973 A | 8/1998 | Blaker |
| 5,793,308 A | 8/1998 | Rosinski |
| 5,793,420 A | 8/1998 | Schmidt |
| 5,793,739 A | 8/1998 | Tanaka |
| 5,793,985 A | 8/1998 | Natarajan |
| 5,794,165 A | 8/1998 | Minowa |
| 5,797,134 A | 8/1998 | McMillan |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank |
| 5,805,079 A | 9/1998 | Lemelson |
| 5,813,745 A | 9/1998 | Fant |
| 5,815,071 A | 9/1998 | Doyle |
| 5,815,093 A | 9/1998 | Kikinis |
| 5,819,198 A | 10/1998 | Peretz |
| 5,825,284 A | 10/1998 | Dunwoody |
| 5,825,412 A | 10/1998 | Hobson |
| 5,844,505 A | 12/1998 | Van |
| 5,845,733 A | 12/1998 | Wolfsen |
| 5,867,802 A | 2/1999 | Borza |
| 5,877,897 A | 3/1999 | Schofield |
| 5,896,167 A | 4/1999 | Omae |
| 5,897,602 A | 4/1999 | Mizuta |
| 5,897,606 A | 4/1999 | Miura et al. |
| 5,899,956 A | 5/1999 | Chan |
| 5,901,806 A | 5/1999 | Takahashi |
| 5,914,748 A | 6/1999 | Parulski et al. |
| 5,919,239 A | 7/1999 | Fraker et al. |
| 5,926,210 A | 7/1999 | Hackett et al. |
| 5,928,291 A | 7/1999 | Jenkins et al. |
| 5,938,321 A | 8/1999 | Bos et al. |
| 5,946,404 A | 8/1999 | Bakshi |
| 5,948,038 A | 9/1999 | Daly |
| 5,959,367 A | 9/1999 | O'Farrell |
| 5,978,017 A | 11/1999 | Tino |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa |
| 6,011,492 A | 1/2000 | Garesche |
| 6,028,528 A | 2/2000 | Lorenzetti |
| 6,037,860 A | 3/2000 | Zander |
| 6,037,977 A | 3/2000 | Peterson |
| 6,041,410 A | 3/2000 | Hsu |
| 6,049,079 A | 4/2000 | Noordam |
| 6,057,754 A | 5/2000 | Kinoshita |
| 6,060,989 A | 5/2000 | Gehlot |
| 6,064,792 A | 5/2000 | Fox |
| 6,067,488 A | 5/2000 | Tano |
| 6,076,026 A | 6/2000 | Jambhekar |
| 6,084,870 A | 7/2000 | Wooten |
| 6,088,635 A | 7/2000 | Cox |
| 6,092,008 A | 7/2000 | Bateman |
| 6,092,021 A | 7/2000 | Ehlbeck |
| 6,092,193 A | 7/2000 | Loomis |
| 6,100,811 A | 8/2000 | Hsu |
| 6,111,254 A | 8/2000 | Eden |
| 6,118,768 A | 9/2000 | Bhatia |
| 6,122,738 A | 9/2000 | Millard |
| 6,141,611 A | 10/2000 | Mackey |
| 6,144,296 A | 11/2000 | Ishida |
| 6,147,598 A | 11/2000 | Murphy |
| 6,151,065 A | 11/2000 | Steed |
| 6,163,338 A | 12/2000 | Johnson |
| 6,163,749 A | 12/2000 | McDonough |
| 6,167,186 A | 12/2000 | Kawasaki |
| 6,170,742 B1 | 1/2001 | Yacoob |
| 6,181,373 B1 | 1/2001 | Coles |
| 6,182,010 B1 | 1/2001 | Berstis |
| 6,185,490 B1 | 2/2001 | Ferguson |
| 6,195,605 B1 | 2/2001 | Tabler |
| 6,200,139 B1 | 3/2001 | Clapper |
| 6,208,919 B1 | 3/2001 | Barkesseh |
| 6,211,907 B1 | 4/2001 | Scaman |
| 6,218,960 B1 | 4/2001 | Ishikawa |
| 6,246,933 B1 | 6/2001 | Baque |
| 6,246,934 B1 | 6/2001 | Otake |
| 6,252,544 B1 | 6/2001 | Hoffberg |
| 6,253,129 B1 | 6/2001 | Jenkins |
| 6,259,475 B1 | 7/2001 | Ramachandran |
| 6,263,265 B1 | 7/2001 | Fera |
| 6,266,588 B1 | 7/2001 | McClellan |
| 6,298,290 B1 | 10/2001 | Abe |
| 6,300,875 B1 | 10/2001 | Schafer |
| 6,324,450 B1 | 11/2001 | Iwama |
| 6,333,759 B1 | 12/2001 | Mazzilli |
| 6,337,622 B1 | 1/2002 | Sugano |
| 6,349,250 B1 | 2/2002 | Hart |
| 6,353,734 B1 | 3/2002 | Wright |
| 6,356,823 B1 | 3/2002 | Iannotti |
| 6,360,147 B1 | 3/2002 | Lee |
| 6,366,207 B1 | 4/2002 | Murphy |
| 6,389,339 B1 | 5/2002 | Just |
| 6,389,340 B1 | 5/2002 | Rayner |
| 6,400,835 B1 | 6/2002 | Lemelson |
| 6,405,112 B1 | 6/2002 | Rayner |
| 6,405,132 B1 | 6/2002 | Breed |
| 6,408,232 B1 | 6/2002 | Cannon |
| 6,411,874 B2 | 6/2002 | Morgan |
| 6,421,080 B1 | 7/2002 | Lambert |

(56) References Cited

U.S. PATENT DOCUMENTS

| | | |
|---|---|---|
| 6,434,510 B1 | 8/2002 | Callaghan |
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese |
| 6,490,513 B1 | 12/2002 | Fish |
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 | 1/2003 | Ishifuji |
| 6,516,256 B1 | 2/2003 | Hartmann |
| 6,518,881 B2 | 2/2003 | Monroe |
| 6,525,672 B2 | 2/2003 | Chainer |
| 6,529,159 B1 | 3/2003 | Fan |
| 6,535,804 B1 | 3/2003 | Chun |
| 6,552,682 B1 | 4/2003 | Fan |
| 6,556,905 B1 | 4/2003 | Mittelsteadt |
| 6,559,769 B2 | 5/2003 | Anthony |
| 6,574,538 B2 | 6/2003 | Sasaki |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins, III |
| 6,594,576 B2 | 7/2003 | Fan et al. |
| 6,611,740 B2 | 8/2003 | Lowrey |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver |
| 6,732,031 B1 | 5/2004 | Lightner |
| 6,732,032 B1 | 5/2004 | Banet |
| 6,735,503 B2 | 5/2004 | Ames |
| 6,737,954 B2 | 5/2004 | Chainer |
| 6,738,697 B2 | 5/2004 | Breed |
| 6,739,078 B2 | 5/2004 | Morley |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg |
| 6,762,513 B2 | 7/2004 | Landgraf |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Oda |
| 6,810,362 B2 | 10/2004 | Adachi |
| 6,812,831 B2 | 11/2004 | Ikeda |
| 6,819,989 B2 | 11/2004 | Maeda |
| 6,831,556 B1 | 12/2004 | Boykin |
| 6,832,140 B2 | 12/2004 | Fan |
| 6,832,141 B2 | 12/2004 | Skeen |
| 6,836,712 B2 | 12/2004 | Nishina |
| 6,842,762 B2 | 1/2005 | Raithel |
| 6,847,873 B1 | 1/2005 | Li |
| 6,850,823 B2 | 2/2005 | Eun |
| 6,859,695 B2 | 2/2005 | Klausner |
| 6,859,705 B2 | 2/2005 | Rao |
| 6,862,524 B1 | 3/2005 | Nagda |
| 6,865,457 B1 | 3/2005 | Mittelsteadt |
| 6,867,733 B2 | 3/2005 | Sandhu |
| 6,873,261 B2 | 3/2005 | Anthony |
| 6,882,313 B1 | 4/2005 | Fan |
| 6,882,912 B2 | 4/2005 | DiLodovico |
| 6,894,606 B2 | 5/2005 | Forbes |
| 6,895,248 B1 | 5/2005 | Akyol |
| 6,898,492 B2 | 5/2005 | De Leon |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose et al. |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 | 11/2006 | Dutu |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 | 9/2007 | Steele |
| 7,266,507 B2 | 9/2007 | Simon |
| 7,272,179 B2 | 9/2007 | Siemens |
| 7,308,341 B2 | 12/2007 | Schofield |
| 7,317,974 B2 | 1/2008 | Luskin |
| 7,343,306 B1 | 3/2008 | Bates |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,457,693 B2 | 11/2008 | Olsen |
| 7,471,189 B2 | 12/2008 | Vastad |
| 7,471,192 B2 | 12/2008 | Hara |
| 7,536,457 B2 | 5/2009 | Miller |
| 7,548,586 B2 | 6/2009 | Mimar |
| 7,561,054 B2 | 7/2009 | Raz |
| 7,584,033 B2 | 9/2009 | Mittelsteadt |
| 7,623,754 B1 | 11/2009 | McKain |
| 7,659,827 B2 | 2/2010 | Gunderson |
| 7,659,835 B2 | 2/2010 | Jung |
| 7,667,731 B2 | 2/2010 | Kreiner |
| 7,702,442 B2 | 4/2010 | Takenaka |
| 7,725,216 B2 | 5/2010 | Kim |
| 7,768,548 B2 | 8/2010 | Silvernail |
| 7,769,499 B2 | 8/2010 | McQuade |
| 7,783,956 B2 | 8/2010 | Ko |
| 7,804,426 B2 | 9/2010 | Etcheson |
| 7,821,421 B2 | 10/2010 | Tamir |
| 7,853,376 B2 | 12/2010 | Peng |
| 7,868,912 B2 | 1/2011 | Venetianer |
| 7,893,958 B1 | 2/2011 | DAgostino |
| 7,940,250 B2 | 5/2011 | Forstall |
| 7,941,258 B1 | 5/2011 | Mittelsteadt |
| 7,974,748 B2 | 7/2011 | Goerick |
| 8,054,168 B2 | 11/2011 | McCormick |
| 8,068,979 B2 | 11/2011 | Breed |
| 8,090,598 B2 | 1/2012 | Bauer |
| 8,113,844 B2 | 2/2012 | Huang |
| 8,139,820 B2 | 3/2012 | Plante |
| 8,140,265 B2 | 3/2012 | Grush |
| 8,140,358 B1 | 3/2012 | Ling |

(56) References Cited

U.S. PATENT DOCUMENTS

| | | |
|---|---|---|
| 8,152,198 B2 | 4/2012 | Breed |
| 8,239,092 B2 | 8/2012 | Plante |
| 8,269,617 B2 | 9/2012 | Cook |
| 8,311,858 B2 | 11/2012 | Everett |
| 8,314,708 B2 | 11/2012 | Gunderson |
| 8,321,066 B2 | 11/2012 | Becker |
| 8,373,567 B2 | 2/2013 | Denson |
| 8,417,562 B1 | 4/2013 | Siemens |
| 8,442,690 B2 | 5/2013 | Goldstein |
| 8,471,701 B2 | 6/2013 | Yariv |
| 8,508,353 B2 | 8/2013 | Cook |
| 8,538,696 B1 | 9/2013 | Cassanova |
| 8,538,785 B2 | 9/2013 | Coleman |
| 8,564,426 B2 | 10/2013 | Cook |
| 8,564,446 B2 | 10/2013 | Gunderson |
| 8,571,755 B2 | 10/2013 | Plante |
| 8,577,703 B2 | 11/2013 | McClellan |
| 8,606,492 B1 | 12/2013 | Botnen |
| 8,635,557 B2 | 1/2014 | Geise |
| 8,676,428 B2 | 3/2014 | Richardson |
| 8,744,642 B2 | 6/2014 | Nemat-Nasser |
| 8,775,067 B2 | 7/2014 | Cho |
| 8,803,695 B2 | 8/2014 | Denson |
| 8,805,110 B2 | 8/2014 | Rhoads |
| 8,849,501 B2 | 9/2014 | Cook |
| 8,855,847 B2 | 10/2014 | Uehara |
| 8,868,288 B2 | 10/2014 | Plante |
| 8,880,279 B2 | 11/2014 | Plante |
| 8,892,310 B1 | 11/2014 | Palmer |
| 8,989,959 B2 | 3/2015 | Plante |
| 8,996,234 B1 | 3/2015 | Tamari |
| 8,996,240 B2 | 3/2015 | Plante |
| 9,047,721 B1 | 6/2015 | Botnen |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,240,079 B2 | 1/2016 | Lambert |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2001/0052730 A1 | 12/2001 | Baur |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0067076 A1 | 6/2002 | Talbot |
| 2002/0087240 A1 | 7/2002 | Raithel |
| 2002/0091473 A1 | 7/2002 | Gardner |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Scaman |
| 2002/0138587 A1 | 9/2002 | Koehler |
| 2002/0163532 A1 | 11/2002 | Thomas |
| 2002/0169529 A1 | 11/2002 | Kim |
| 2002/0169530 A1 | 11/2002 | Laguer-Diaz |
| 2002/0183905 A1 | 12/2002 | Maeda |
| 2003/0016753 A1 | 1/2003 | Kim |
| 2003/0028298 A1 | 2/2003 | Macky |
| 2003/0053433 A1 | 3/2003 | Chun |
| 2003/0055557 A1 | 3/2003 | Dutta |
| 2003/0065805 A1 | 4/2003 | Barnes, Jr. |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0144775 A1 | 7/2003 | Klausner |
| 2003/0152145 A1 | 8/2003 | Kawakita |
| 2003/0154009 A1 | 8/2003 | Basir |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters et al. |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |
| 2004/0070926 A1 | 4/2004 | Boykin |
| 2004/0083041 A1 | 4/2004 | Skeen |
| 2004/0088090 A1 | 5/2004 | Wee |
| 2004/0103008 A1 | 5/2004 | Wahlbin |
| 2004/0103010 A1 | 5/2004 | Wahlbin |
| 2004/0104842 A1 | 6/2004 | Drury |
| 2004/0111189 A1 | 6/2004 | Miyazawa |
| 2004/0138794 A1 | 7/2004 | Saito |
| 2004/0145457 A1 | 7/2004 | Schofield |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |
| 2004/0230370 A1 | 11/2004 | Tzamaloukas |
| 2004/0230373 A1 | 11/2004 | Tzamaloukas |
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic |
| 2004/0254698 A1 | 12/2004 | Hubbard |
| 2004/0267419 A1 | 12/2004 | Jeng |
| 2005/0021199 A1 | 1/2005 | Zimmerman |
| 2005/0043869 A1 | 2/2005 | Funkhouser |
| 2005/0060070 A1 | 3/2005 | Kapolka |
| 2005/0060071 A1 | 3/2005 | Winner |
| 2005/0065682 A1 | 3/2005 | Kapadia |
| 2005/0065716 A1 | 3/2005 | Timko |
| 2005/0073585 A1 | 4/2005 | Ettinger |
| 2005/0078423 A1 | 4/2005 | Kim |
| 2005/0088291 A1 | 4/2005 | Blanco |
| 2005/0099498 A1 | 5/2005 | Lao |
| 2005/0100329 A1 | 5/2005 | Lao |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1 | 7/2005 | Carmichael |

(56) References Cited

U.S. PATENT DOCUMENTS

| | | |
|---|---|---|
| 2005/0149238 A1 | 7/2005 | Stefani |
| 2005/0149259 A1 | 7/2005 | Cherveny |
| 2005/0152353 A1 | 7/2005 | Couturier |
| 2005/0159964 A1 | 7/2005 | Sonnenrein |
| 2005/0166258 A1 | 7/2005 | Vasilevsky |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Hoist |
| 2005/0200714 A1 | 9/2005 | Marchese |
| 2005/0203683 A1 | 9/2005 | Olsen |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0251304 A1 | 11/2005 | Cancellara |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | DeWaal |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0129578 A1 | 6/2006 | Kim |
| 2006/0142913 A1 | 6/2006 | Coffee |
| 2006/0143435 A1 | 6/2006 | Kwon |
| 2006/0147187 A1 | 7/2006 | Takemoto |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0184295 A1 | 8/2006 | Hawkins |
| 2006/0192658 A1 | 8/2006 | Yamamura |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly et al. |
| 2006/0209840 A1 | 9/2006 | Paatela |
| 2006/0212195 A1 | 9/2006 | Veith |
| 2006/0215884 A1 | 9/2006 | Ota |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0035632 A1 | 2/2007 | Silvernail |
| 2007/0043487 A1 | 2/2007 | Krzystofczyk |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |
| 2007/0143499 A1 | 6/2007 | Chang |
| 2007/0150138 A1 | 6/2007 | Plante |
| 2007/0150140 A1 | 6/2007 | Seymour |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0216521 A1 | 9/2007 | Guensler |
| 2007/0219685 A1 | 9/2007 | Plante |
| 2007/0219686 A1 | 9/2007 | Plante |
| 2007/0241874 A1 | 10/2007 | Okpysh |
| 2007/0244614 A1 | 10/2007 | Nathanson |
| 2007/0253307 A1 | 11/2007 | Mashimo |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | DeMarco |
| 2007/0263984 A1 | 11/2007 | Sterner |
| 2007/0268158 A1 | 11/2007 | Gunderson |
| 2007/0271105 A1 | 11/2007 | Gunderson |
| 2007/0273480 A1 | 11/2007 | Burkman |
| 2007/0279214 A1 | 12/2007 | Buehler |
| 2007/0280677 A1 | 12/2007 | Drake |
| 2007/0299612 A1 | 12/2007 | Kimura |
| 2008/0035108 A1 | 2/2008 | Ancimer |
| 2008/0059019 A1 | 3/2008 | Delia |
| 2008/0071827 A1 | 3/2008 | Hengel |
| 2008/0111666 A1 | 5/2008 | Plante |
| 2008/0122603 A1 | 5/2008 | Plante |
| 2008/0143834 A1 | 6/2008 | Comeau |
| 2008/0147267 A1 | 6/2008 | Plante |
| 2008/0157510 A1 | 7/2008 | Breed |
| 2008/0167775 A1 | 7/2008 | Kuttenberger |
| 2008/0169914 A1 | 7/2008 | Albertson |
| 2008/0177436 A1 | 7/2008 | Fortson |
| 2008/0195261 A1 | 8/2008 | Breed |
| 2008/0204556 A1 | 8/2008 | de Miranda |
| 2008/0211779 A1 | 9/2008 | Pryor |
| 2008/0234920 A1 | 9/2008 | Nurminen |
| 2008/0243389 A1 | 10/2008 | Inoue |
| 2008/0252412 A1 | 10/2008 | Larsson |
| 2008/0252485 A1 | 10/2008 | Lagassey |
| 2008/0252487 A1 | 10/2008 | McClellan |
| 2008/0269978 A1 | 10/2008 | Shirole |
| 2008/0281485 A1 | 11/2008 | Plante |
| 2008/0309762 A1 | 12/2008 | Howard et al. |
| 2008/0319604 A1 | 12/2008 | Follmer |
| 2009/0009321 A1 | 1/2009 | McClellan |
| 2009/0043500 A1 | 2/2009 | Satoh |
| 2009/0043971 A1 | 2/2009 | Kim |
| 2009/0051510 A1 | 2/2009 | Follmer |
| 2009/0138191 A1 | 5/2009 | Engelhard |
| 2009/0157255 A1 | 6/2009 | Plante |
| 2009/0216775 A1 | 8/2009 | Ratliff et al. |
| 2009/0224869 A1 | 9/2009 | Baker |
| 2009/0290848 A1 | 11/2009 | Brown |
| 2009/0299622 A1 | 12/2009 | Denaro |
| 2009/0312998 A1 | 12/2009 | Berckmans |
| 2009/0326796 A1 | 12/2009 | Prokhorov |
| 2009/0327856 A1 | 12/2009 | Mouilleseaux |
| 2010/0030423 A1 | 2/2010 | Nathanson |
| 2010/0045451 A1 | 2/2010 | Periwal |
| 2010/0049516 A1 | 2/2010 | Talwar |
| 2010/0054709 A1 | 3/2010 | Misawa |
| 2010/0057342 A1 | 3/2010 | Muramatsu |

(56) References Cited

U.S. PATENT DOCUMENTS

| | | |
|---|---|---|
| 2010/0063672 A1 | 3/2010 | Anderson |
| 2010/0063680 A1 | 3/2010 | Tolstedt |
| 2010/0063850 A1 | 3/2010 | Daniel |
| 2010/0070175 A1 | 3/2010 | Soulchin |
| 2010/0076621 A1 | 3/2010 | Kubotani |
| 2010/0085193 A1 | 4/2010 | Boss |
| 2010/0085430 A1 | 4/2010 | Kreiner |
| 2010/0087984 A1 | 4/2010 | Joseph |
| 2010/0100315 A1 | 4/2010 | Davidson |
| 2010/0103165 A1 | 4/2010 | Lee |
| 2010/0104199 A1 | 4/2010 | Zhang |
| 2010/0149418 A1 | 6/2010 | Freed |
| 2010/0153146 A1 | 6/2010 | Angell |
| 2010/0157061 A1 | 6/2010 | Katsman |
| 2010/0191411 A1 | 7/2010 | Cook |
| 2010/0201875 A1 | 8/2010 | Rood |
| 2010/0220892 A1 | 9/2010 | Kawakubo |
| 2010/0250020 A1 | 9/2010 | Lee |
| 2010/0250021 A1 | 9/2010 | Cook |
| 2010/0250060 A1 | 9/2010 | Maeda |
| 2010/0250116 A1 | 9/2010 | Yamaguchi |
| 2010/0253918 A1 | 10/2010 | Seder |
| 2010/0268415 A1 | 10/2010 | Ishikawa |
| 2010/0283633 A1 | 11/2010 | Becker |
| 2010/0312464 A1 | 12/2010 | Fitzgerald |
| 2011/0035139 A1 | 2/2011 | Konlditslotis |
| 2011/0043624 A1 | 2/2011 | Haug |
| 2011/0060496 A1 | 3/2011 | Nielsen |
| 2011/0077028 A1 | 3/2011 | Wilkes |
| 2011/0091079 A1 | 4/2011 | Yu-Song |
| 2011/0093159 A1 | 4/2011 | Boling |
| 2011/0112995 A1 | 5/2011 | Chang |
| 2011/0121960 A1 | 5/2011 | Tsai |
| 2011/0125365 A1 | 5/2011 | Larschan |
| 2011/0130916 A1 | 6/2011 | Mayer |
| 2011/0140884 A1 | 6/2011 | Santiago |
| 2011/0145042 A1 | 6/2011 | Green |
| 2011/0161116 A1 | 6/2011 | Peak |
| 2011/0166773 A1 | 7/2011 | Raz |
| 2011/0173015 A1 | 7/2011 | Chapman |
| 2011/0208428 A1 | 8/2011 | Matsubara |
| 2011/0212717 A1 | 9/2011 | Rhoads |
| 2011/0213628 A1 | 9/2011 | Peak |
| 2011/0224891 A1 | 9/2011 | Iwuchukwu |
| 2011/0251752 A1 | 10/2011 | DeLarocheliere |
| 2011/0251782 A1 | 10/2011 | Perkins |
| 2011/0254676 A1 | 10/2011 | Marumoto |
| 2011/0257882 A1 | 10/2011 | McBurney |
| 2011/0273568 A1 | 11/2011 | Lagassey |
| 2011/0282542 A9 | 11/2011 | Nielsen |
| 2011/0283223 A1 | 11/2011 | Vaittinen et al. |
| 2011/0304446 A1 | 12/2011 | Basson |
| 2012/0021386 A1 | 1/2012 | Anderson |
| 2012/0035788 A1 | 2/2012 | Trepagnier |
| 2012/0041675 A1 | 2/2012 | Juliver |
| 2012/0046803 A1 | 2/2012 | Inou |
| 2012/0071140 A1 | 3/2012 | Oesterling |
| 2012/0078063 A1 | 3/2012 | Moore-Ede |
| 2012/0081567 A1 | 4/2012 | Cote |
| 2012/0100509 A1 | 4/2012 | Gunderson |
| 2012/0109447 A1 | 5/2012 | Yousefi |
| 2012/0123806 A1 | 5/2012 | Schumann |
| 2012/0134547 A1 | 5/2012 | Jung |
| 2012/0150436 A1 | 6/2012 | Rossano |
| 2012/0176234 A1 | 7/2012 | Taneyhill |
| 2012/0190001 A1 | 7/2012 | Knight |
| 2012/0210252 A1 | 8/2012 | Fedoseyeva |
| 2012/0277950 A1 | 11/2012 | Plante |
| 2012/0283895 A1 | 11/2012 | Noda |
| 2012/0330528 A1 | 12/2012 | Schwindt |
| 2013/0004138 A1 | 1/2013 | Kilar |
| 2013/0006469 A1 | 1/2013 | Green |
| 2013/0021148 A1 | 1/2013 | Cook |
| 2013/0028320 A1 | 1/2013 | Gardner |
| 2013/0030660 A1 | 1/2013 | Fujimoto |
| 2013/0073112 A1 | 3/2013 | Phelan |
| 2013/0073114 A1 | 3/2013 | Nemat-Nasser |
| 2013/0096731 A1 | 4/2013 | Tamari |
| 2013/0145269 A1 | 6/2013 | Latulipe |
| 2013/0151980 A1 | 6/2013 | Lee |
| 2013/0170762 A1 | 7/2013 | Marti |
| 2013/0197774 A1 | 8/2013 | Denson |
| 2013/0274950 A1 | 10/2013 | Richardson |
| 2013/0317711 A1 | 11/2013 | Plante |
| 2013/0332004 A1 | 12/2013 | Gompert et al. |
| 2013/0345927 A1 | 12/2013 | Cook |
| 2013/0345929 A1 | 12/2013 | Bowden |
| 2014/0025225 A1 | 1/2014 | Armitage |
| 2014/0025254 A1 | 1/2014 | Plante |
| 2014/0032062 A1 | 1/2014 | Baer |
| 2014/0046550 A1 | 2/2014 | Palmer |
| 2014/0047371 A1 | 2/2014 | Palmer |
| 2014/0089504 A1 | 3/2014 | Scholz |
| 2014/0098228 A1 | 4/2014 | Plante |
| 2014/0152828 A1 | 6/2014 | Plante |
| 2014/0226010 A1 | 8/2014 | Molin |
| 2014/0232863 A1 | 8/2014 | Paliga |
| 2014/0279707 A1 | 9/2014 | Joshua |
| 2014/0280204 A1 | 9/2014 | Avery |
| 2014/0300739 A1 | 10/2014 | Mimar |
| 2014/0309849 A1 | 10/2014 | Ricci |
| 2014/0335902 A1 | 11/2014 | Guba |
| 2014/0336916 A1 | 11/2014 | Yun |
| 2015/0035665 A1 | 2/2015 | Plante |
| 2015/0057836 A1 | 2/2015 | Plante |
| 2015/0105934 A1 | 4/2015 | Palmer |
| 2015/0134226 A1 | 5/2015 | Palmer |
| 2015/0135240 A1 | 5/2015 | Shibuya |
| 2015/0156174 A1 | 6/2015 | Fahey |
| 2015/0189042 A1 | 7/2015 | Sun |
| 2015/0222449 A1 | 8/2015 | Salinger |
| 2015/0317846 A1 | 11/2015 | Plante |

FOREIGN PATENT DOCUMENTS

| | | |
|---|---|---|
| CA | 2692415 A1 | 8/2011 |
| DE | 4416991 A1 | 11/1995 |
| DE | 20311262 | 9/2003 |
| DE | 202005008238 | 9/2005 |
| DE | 102004004669 | 12/2005 |
| DE | 102004004669 A1 | 12/2005 |
| EP | 0708427 A2 | 4/1996 |
| EP | 0840270 A2 | 5/1998 |
| EP | 0848270 A2 | 5/1998 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| EP | 2104075 | 9/2009 |
| EP | 2320387 | 5/2011 |
| EP | 2407943 | 1/2012 |
| GB | 2268608 A | 1/1994 |
| GB | 2402530 | 12/2004 |
| GB | 2402530 A | 12/2004 |
| GB | 2451485 | 2/2009 |
| GB | 2447184 B | 6/2011 |
| GB | 2446994 | 8/2011 |
| JP | 58085110 | 5/1983 |
| JP | S5885110 A | 5/1983 |
| JP | 62091092 | 4/1987 |
| JP | S6291092 A | 4/1987 |
| JP | S62166135 A | 7/1987 |
| JP | 02056197 | 2/1990 |
| JP | H0256197 A | 2/1990 |
| JP | H04257189 A | 9/1992 |
| JP | H05137144 A | 6/1993 |
| JP | 5294188 | 11/1993 |
| JP | H08124069 A | 5/1996 |
| JP | H09163357 A | 6/1997 |
| JP | H09272399 A | 10/1997 |
| JP | 10076880 | 3/1998 |
| JP | H1076880 A | 3/1998 |
| JP | 2002191017 A | 7/2002 |

(56) References Cited

FOREIGN PATENT DOCUMENTS

| KR | 1000588169 | | 12/2000 |
|---|---|---|---|
| WO | 8809023 | A1 | 11/1988 |
| WO | 9005076 | | 5/1990 |
| WO | 9427844 | | 12/1994 |
| WO | 9600957 | A1 | 1/1996 |
| WO | 9701246 | | 1/1997 |
| WO | 9726750 | A1 | 7/1997 |
| WO | 9937503 | | 7/1999 |
| WO | 9940545 | A1 | 8/1999 |
| WO | 9962741 | | 12/1999 |
| WO | 0007150 | A1 | 2/2000 |
| WO | 0028410 | A1 | 5/2000 |
| WO | 0048033 | | 8/2000 |
| WO | 0077620 | | 12/2000 |
| WO | 0123214 | | 4/2001 |
| WO | 0125054 | | 4/2001 |
| WO | 0146710 | A2 | 6/2001 |
| WO | 03045514 | | 6/2003 |
| WO | 2006022824 | | 3/2006 |
| WO | 2006022824 | A2 | 3/2006 |
| WO | 2007067767 | | 6/2007 |
| WO | 2009081234 | | 7/2009 |
| WO | 2011055743 | A1 | 5/2011 |
| WO | 2013072939 | | 5/2013 |
| WO | 2013159853 | | 10/2013 |

OTHER PUBLICATIONS

Ambulance Companies Use Video Technology to Improve Driving Behavior, Ambulance Industry Journal, Spring 2003.
Amended Complaint for Patent Infringement, Trade Secret Misappropriation, Unfair Competition and Conversion in *DriveCam, Inc. v. SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of U.S. Appl. No. 11/566,424.
Answer to Amended Complaint; Counterclaims; and Demand for Jury Trial in *DriveCam, Inc. v. SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History.
U.S. Appl. No. 11/297,669, filed Dec. 8, 2005, File History.
U.S. Appl. No. 11/297,889, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/593,882, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
Bill, 'DriveCam—FAQ', Dec. 12, 2003.
Bill Siuru, 'DriveCam Could Save You Big Bucks', Land Line Magazine, May-Jun. 2000.
Chris Woodyard, 'Shuttles save with DriveCam', Dec. 9, 2003.
Dan Carr, Flash Video Template: Video Presentation with Navigation, Jan. 16, 2006, http://www.adobe.com/devnet/fiash/articles/vidtemplate_mediapreso_flash8.html.
David Cullen, 'Getting a real eyeful', Fleet Owner Magazine, Feb. 2002.
David Maher, 'DriveCam Brochure Folder', Jun. 6, 2005.
David Maher, "DriveCam Brochure Folder", Jun. 8, 2005.
David Vogeleer et al., Macromedia Flash Professional 8UNLEASHED (Sams Oct. 12, 2005).
Del Lisk, 'DriveCam Training Handout Ver4', Feb. 3, 2005.
Drivecam, Inc., User's Manual for Drivecam Video Systems' Hindsight 20/20 Software Version 4.0 (2003).
DriveCam, Inc.'s Infringement Contentions Exhibit A, U.S. Patent 6,389,340, Document 34.1, Oct. 20, 2011.
DriveCam, Inc.'s Infringement Contentions Exhibit B, U.S. Patent 7,659,827. Aug. 19, 2011.
DriveCam, Inc.'s Infringement Contentions Exhibit B, U.S. Patent 7,804,426, Document 34.2, Oct. 20, 2011.
DriveCam, Inc.'s Infringement Contentions Exhibit C, U.S. Patent 7,659,827, Document 34.3, Oct. 20, 2011.
DriveCam, Inc.'s Infringement Contentions Exhibit C, U.S. Patent 7,804,426. Aug. 19, 2011.
DriveCam, Inc.'s Infringement Contentions Exhibit D, Document 34.4, Oct. 20, 2011.
DriveCam—Illuminator Data Sheet, Oct. 2, 2004.
Drivecam.com as retrieved by the Internet Wayback Machine as of Mar. 5, 2005.
DriveCam's Disclosure of Asserted Claims and Preliminary Infringement Contentions in *DriveCam, Inc. v. SmartDrive Systems, Inc.*, Case No. 3:11-CV-00997-H-RBB, for the Southern District of California. Aug. 19, 2011.
DriveCam Driving Feedback System, Mar. 15, 2004.
DriveCam Extrinsic Evidence with Patent LR 4.1 .a Disclosures, Nov. 3, 2011.
DriveCam Extrinsic Evidence with Patent LR 4.1 .a Disclosures, Nov. 8, 2011.
Driver Feedback System, Jun. 12, 2001.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 3, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Exhibit A, Document 55, filed Jan. 3, 2012, pp. 49-103.
Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4- 24 (2006); Digital Object Identifier 10.1109/MVT.2006.343641.
Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.
GE published its VCR User's Guide for Model VG4255 in 1995.
Glenn Oster, 'Hindsight 20/20 v4.0 Software Installation', 1 of 2, Jun. 20, 2003.
Glenn Oster, 'HindSight 20/20 v4.0 Software Installation', 2 of 2, Jun. 20, 2003.
Glenn Oster, 'Illuminator Installation', Oct. 3, 2004.
Hans Fantel, Video; Search Methods Make a Difference in Picking VCR's, NY Times, Aug. 13, 1989.
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY &Categorys- ub.--Code=coaching)., printed from site on Jan. 11, 2012.

(56) References Cited

OTHER PUBLICATIONS

Inovate Motorsports, OT-1 16 Channel OBD-II Interface User Manual, Version 1.0, Nov. 28, 2007, pp. 3, 4, 21 & 27.
Interior Camera Data Sheet, Oct. 26, 2001.
International Search Report and Written Opinion issued in PCT/US07/68325 on Feb. 27, 2008.
International Search Report and Written Opinion issued in PCT/US07/68328 on Oct. 15, 2007.
International Search Report and Written Opinion issued in PCT/US07/68329 on Mar. 3, 2008.
International Search Report and Written Opinion issued in PCT/US07/68332 on Mar. 3, 2008.
International Search Report and Written Opinion issued in PCT/US07/68334 on Mar. 5, 2008.
International Search Report for PCT/US2006/47055, Mailed Mar. 20, 2008 (2 pages).
International Search Report issued in PCT/US2006/47042 mailed Feb. 25, 2008.
J. Gal.Lagher, 'Lancer Recommends Tech Tool', Insurance and Technology Magazine, Feb. 2002.
Jean (DriveCam vendor), 'DC Data Sheet', Nov. 6, 2002.
Jean (DriveCam vendor), 'DriveCam brochure', Nov. 6, 2002.
Jean (DriveCam vendor), 'Feedback Data Sheet', Nov. 6, 2002.
Jean (DriveCam vendor), 'Hindsight 20-20 Data Sheet', Nov. 4, 2002.
Jessyca Wallace, 'Analyzing and Processing DriveCam Recorded Events', Oct. 6, 2003.
Jessyca Wallace, 'Overview of the DriveCam Program', Dec. 15, 2005.
Jessyca Wallace, 'The DriveCam Driver Feedback System', Apr. 6, 2004.
Joint Claim Construction Chart, U.S. Patent No. 6,389,340, 'Vehicle Data Recorder' for Case No. 3:11-CV-00997-H-RBB, Document 43-1, filed Dec. 1, 2011, pp. 1-33.
Joint Claim Construction Chart in *DriveCam, Inc.* v. *SmartDrive Systems, Inc.*, Case No. 11-CV-0997-H (RBB), for the Southern District of California, Document 43, filed Dec. 1, 2011, pp. 1-2.
Joint Claim Construction Worksheet, U.S. Patent No. 6,389,340, 'Vehicle Data Reporter' for Case No. 3:11-CV-00997-H-RBB, Document 44-1, filed Dec. 1, 2011, pp. 1-10.
Joint Claim Construction Worksheet, U.S. Patent No. 6,389,340, "Vehicle Data Reporter" for Case No. 3:11-CV-00997-H-RBB, Document 44-1, filed Dec. 1, 2011, pp. 1-10.
Joint Claim Construction Worksheet in *DriveCam, Inc.* v. *SmartDrive Systems, Inc.*, Case No. 3:11-CV-00997 H (RBB), for the Southern District of California, Document 44, filed Dec. 1, 2011, pp. 1-2.
Joint Motion for Leave to Supplement Disclosure of Asserted Claims and Preliminary Infringement Contentions in *DriveCam, Inc.* v. *SmartDrive Systems, Inc.*, Case No. 3:11-cv-00997-H-RBB, Document 29, filed Oct. 12, 2011, pp. 1-7.
Julie Stevens, 'DriveCam Services', Nov. 15, 2004.
Julie Stevens, 'Program Support Roll-Out & Monitoring', Jul. 13, 2004.
Jung, Sang-Hack, et al., Egomotion Estimation in Monocular Infrared Image Sequence for Night Vision Applications, IEEE Workshop on Applications of Computer Vision (WACV '07), Feb. 2007, pp. 8-8; Digital Object Identifier 10.1109/WACV.2007.20.
JVC Company of America, JVC Video Cassette Recorder HR-IP820U Instructions (1996).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.
Karen, 'Downloading Options to HindSight 20120', Aug. 6, 2002.
Karen, 'Managers Guide to the DriveCam Driving Feedback System', Jul. 30, 2002.

Kathy Latus (Latus Design), 'Case Study—Cloud 9 Shuttle', Sep. 23, 2005.
Kathy Latus (Latus Design), 'Case Study—Lloyd Pest Control', Jul. 19, 2005.
Kathy Latus (Latus Design), 'Case Study—Time Warner Cable', Sep. 23, 2005.
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/SERA.2006.8.
Kitchin, Charles. "Understanding accelerometer scale factor and offset adjustments." Analog Devices (1995).
Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa Mckenna, 'A Fly on the Windshield?', Pest Control Technology Magazine, Apr. 2003.
Miller, D.P., Evaluation of Vision Systems for Teleoperated Land Vehicles. Control Systems Magazine, IEEE, 8(3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Panasonic Corporation, Video Cassette Recorder (VCR) Operating Instructions for Models No. PV-V4020/PV-V4520.
Passenger Transportation Mode Brochure, May 2, 2005.
Patent Abstracts of Japan vol. 007, No. 180 (P-215), Aug. 9, 1983 & JP 58 085110 A (Mitsuhisa Ichikawa), May 21, 1983.
Patent Abstracts of Japan vol. 011, No. 292 (E-543), Sep. 19, 1987 & JP 62 091092 A (OK ENG:KK), Apr. 25, 1987.
Patent Abstracts of Japan vol. 012, No. 001 (M-656), Jan. 6, 1988 & JP 62 166135 A (Fuji Electric Co Ltd), Jul. 22, 1987.
Patent Abstracts of Japan vol. 014, No. 222 (E-0926), May 10, 1990 & JP 02 056197 A (Sanyo Electric Co Ltd), Feb. 26, 1990.
Patent Abstracts of Japan vol. 017, No. 039 (E-1311), Jan. 25, 1993 & JP 04 257189 A (Sony Corp), Sep. 11, 1992.
Patent Abstracts of Japan vol. 017, No. 521 (E-1435), Sep. 20, 1993 & JP 05 137144 A (Kyocera Corp), Jun. 1, 1993.
Patent Abstracts of Japan vol. 1996, No. 09, Sep. 30, 1996 & JP 08 124069 A (Toyota Motor Corp), May 17, 1996.
Patent Abstracts of Japan vol. 1997, No. 10, Oct. 31, 1997 & JP 09 163357 A (Nippon Soken Inc), Jun. 20, 1997.
Patent Abstracts of Japan vol. 1998, No. 02, Jan. 30, 1998 & JP 09 272399 A (Nippon Soken Inc), Oct. 21, 1997.
Patent Abstracts of Japan vol. 1998, No. 8, Jun. 30, 1998 & JP 10 076880 A (Muakami Corp), Mar. 24, 1998.
PCT/US2010/022012, Invitation to Pay Additional Fees with Communication of Partial International Search, Jul. 21, 2010.
Peter G. Thurlow, Letter (including exhibits) Regarding Patent Owner's Response to Initial Office Action in Ex Parte Reexamination, Mar. 27, 2012.
Preliminary Claim Construction and Identification of Extrinsic Evidence of Defendant/Counterclaimant SmartDriveSystems, Inc. in *DriveCam, Inc.* v. *SmartDrive Systems, Inc.*, Case No. 3:11-CV-00997-H (RBB), for the Southern District of California. Nov. 8, 2011.
Quinn Maughan, 'DriveCam Enterprise Services', Jan. 5, 2006.
Quinn Maughan, 'DriveCam Managed Services', Jan. 5, 2006.
Quinn Maughan, 'DriveCam Standard Edition', Jan. 5, 2006.
Quinn Maughan, 'DriveCam Unit Installation', Jul. 21, 2005.
Quinn Maughan, 'Enterprise Services', Apr. 17, 2006.
Quinn Maughan, 'Enterprise Services', Apr. 7, 2006.
Quinn Maughan, 'Hindsight Installation Guide', Sep. 29, 2005.
Quinn Maughan, 'Hindsight Users Guide', Jun. 7, 2005.
Ronnie Rittenberry, 'Eyes on the Road', Jul. 2004.
SmartDrives Systems, Inc's Production, SO14246-S014255, Nov. 16, 2011.
Supplement to DriveCam's Disclosure of Asserted Claims and Preliminary Infringement Contentions' in *DriveCam, Inc.* v.

(56) References Cited

OTHER PUBLICATIONS

*SmartDrive Systems, Inc.*, Case No. 3:11-CV-00997-H-RBB, for the Southern District of California. Oct. 14, 2011.
The DriveCam, Nov. 6, 2002.
The DriveCam, Nov. 8, 2002.
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012.
Trivinci Systems, LLC, Race-Keeper Systems User Guide, Jan. 2011, v1, 1.02, pp. 34 and 39.
U.S. Appl. No. 12/691,639, entitled 'Driver Risk Assessment System and Method Employing Selectively Automatic Event Scoring', filed Jan. 21, 2010.
U.S. Appl. No. 11/377,167, Final Office Action dated Nov. 8, 2013.
U.S. Appl. No. 11/377,157, filed Mar. 16, 2006 entitled, "Vehicle Event Recorder Systems and Networks Having Parallel Communications Links".
U.S. Appl. No. 11/377,167, filed Mar. 16, 2006 entitled, "Vehicle Event Recorder Systems and Networks Having Integrated Cellular Wireless Communications Systems".
USPTO Final Office Action for U.S. Appl. No. 11/297,669, mailed Nov. 7, 2011, 15 pages.
USPTO Final Office Action for U.S. Appl. No. 13/957,810, mailed Jun. 27, 2014, 24 pages.
USPTO Non-Final Office Action for U.S. Appl. No. 11/296,906, mailed Apr. 2, 2009, 7 pages.
USPTO Non-Final Office Action for U.S. Appl. No. 11/296,906, mailed Nov. 6, 2009, 9 pages.
USPTO Non-Final Office Action for U.S. Appl. No. 11/297,669, mailed Apr. 28, 2011, 11 pages.
USPTO Non-Final Office Action for U.S. Appl. No. 11/299,028, mailed Apr. 24, 2008, 9 pages.
USPTO Non-Final Office Action for U.S. Appl. No. 11/377,164, mailed Nov. 19, 2007, 7 pages.
USPTO Non-Final Office Action for U.S. Appl. No. 11/377,164, mailed Nov. 25, 2011, 9 pages.
USPTO Non-Final Office Action for U.S. Appl. No. 11/377,164, mailed Sep. 11, 2008, 8 pages.
USPTO Non-Final Office Action for U.S. Appl. No. 11/377,167, mailed Jun. 5, 2008, 11 pages.
USPTO Non-Final Office Action for U.S. Appl. No. 11/800,876, mailed Dec. 1, 2010, 12 pages.
USPTO Non-Final Office Action for U.S. Appl. No. 11/800,876, mailed Dec. 20, 2011, 8 pages.
USPTO Non-Final Office Action for U.S. Appl. No. 12/096,591, mailed May 20, 2014, 19 pages.
USPTO Non-Final Office Action for U.S. Appl. No. 14/036,299, mailed Aug. 12, 2014.
USPTO Non-Final Office Action for U.S. Appl. No. 11/296,907, Mailed Mar. 22, 2007 (17 pages).
USPTO Non-final Office Action mailed Aug. 27, 2009 during prosecution of U.S. Appl. No. 11/566,424.
USPTO Non-Final Office Action mailed Nov. 27, 2013 in U.S. Appl. No. 13/957,810, filed Aug. 2, 2013.
Veeraraghavan, H., et al., Computer Vision Algorithms for Intersection Monitoring, IEEE Transactions on Intelligent Transportation Systems, 4(2):78- 89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).
World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011.
Written Opinion issued in PCT/US07/68328 on Oct. 15, 2007.
Written Opinion of the International Searching Authority for PCT/US2006/47042. Mailed Feb. 25, 2008 (5 pages).
Written Opinion of the International Searching Authority for PCT/US2006/47055, Mailed Mar. 20, 2008 (5 pages).
"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc.* v. *SmartDrive Systems, Inc.*, Case No. 3:11-CV-00997-H-RBB, for the Southern District of California. Nov. 8, 2011, 68 pages.
"DriveCam Driving Feedback System", DriveCam brochure, Jun. 12, 2001, Document #6600128, 2 pages.
"DriveCam Driving Feedback System" DriveCam brochure, Mar. 15, 2004, 4 pages.
"DriveCam Passenger Transportation Module", DriveCam brochure, Oct. 26, 2001, 2 pages.
"DriveCam Video Event Data Recorder", DriveCam brochure, Nov. 6, 2002, Document #6600127, 2 pages.
"Responsive Claim Construction and Identification of Extrinsic Evidence of Defendani/Counterclaimant SmartDrive Systems, Inc." Claim Construction and and Extrinsic Evidence in *DriveCam, Inc.* v. *SmartDrive Systems, Inc.*, Case No. 3:11-CV-00997-H (RBB), for the Southern District of California. Nov. 15, 2011, 20 pages.
"Sonic MyDVD 4.0: Tutorial: Trimming video segments". Tutorial for software bundled with Adaptec VideoOh! DVD USB 2.0 Edition, 2003, 13 pages.
"User's Manual for DriveCam Video Systems' HindSight 20/20 Software Version 4.0" DriveCam Manual, San Diego, 2003, Document #6600141-1, 54 pages.
Canadian Office Action issued in Application No. 2,632,685 dated Jan. 30, 2015; 5 pages.
Dan Maher, "DriveCam Taking Risk Out of Driving", DriveCam brochure folder, Jun. 6, 2005, 6 pages.
Del Lisk, "DriveCam Training Seminar" Handout, 2004, 16 pages.
European Examination Report issued in EP 07772812.9 on Jan. 22, 2015; 5 pages.
Jean (DriveCam vendor) "DriveCam Driving Feedback System", DriveCam brochure, Nov. 6, 2002, Document #6600128-1, 2 pages.
Notice of Allowance Allowance for U.S. Appl. No. 14/036,299, mailed Mar. 20, 2015, 5 pages.
Notice of Allowance Application for U.S. Appl. No. 11/566,424, mailed Feb. 26, 2010, 6 pages.
Notice of Allowance for U.S. Appl. No. 11/377,164, mailed Dec. 3, 2014, 5 pages.
Notice of Allowance for U.S. Appl. No. 11/377,164, mailed Feb. 13, 2015, 2 pages.
Notice of Allowance for U.S. Appl. No. 11/377,164, mailed Feb. 25, 2014, 2 pages.
Notice of Allowance for U.S. Appl. No. 11/377,164, mailed Nov. 18, 2013, 7 pages.
Notice of Allowance for U.S. Appl. No. 11/377,167, mailed Apr. 1, 2015, 7 pages.
Notice of Allowance for U.S. Appl. No. 11/800,876, mailed Apr. 19, 2012, 8 pages.
USPTO Final Office Action for U.S. Appl. No. 11/296,906, mailed Aug. 8, 2012, 15 pages.
USPTO Final Office Action for U.S. Appl. No. 12/096,591, mailed Dec. 5, 2014, 23 pages.
USPTO Final Office Action for U.S. Appl. No. 12/096,591, mailed Jul. 18, 2012, 15 pages.
USPTO Final Office Action for U.S. Appl. No. 12/096,591, mailed Nov. 7, 2013, 14 pages.
USPTO Final Office Action for U.S. Appl. No. 13/957,810, mailed Jun. 27, 2014, 22 pages.
USPTO Final Office Action for U.S. Appl. No. 14/036,299, mailed Feb. 24, 2015, 9 pages.
USPTO Non-Final Office Action for U.S. Appl. No. 11/296,906, mailed Apr. 8, 2014, 19 pages.
USPTO Non-Final Office Action for U.S. Appl. No. 11/296,906, mailed Jun. 12, 2012, 13 pages.
USPTO Non-Final Office Action for U.S. Appl. No. 11/377,164, mailed Apr. 7, 2014, 7 pages.
USPTO Non-Final Office Action for U.S. Appl. No. 11/377,164, mailed Aug. 18, 2014, 5 pages.
USPTO Non-Final Office Action for U.S. Appl. No. 11/377,164, mailed Sep. 10, 2012, 10 pages.

(56) References Cited

OTHER PUBLICATIONS

USPTO Non-Final Office Action for U.S. Appl. No. 11/377,167, mailed Jun. 27, 2013, 11 pages.
USPTO Non-Final Office Action for U.S. Appl. No. 12/096,591, mailed Jun. 14, 2011, 8 pages.
USPTO Non-Final Office Action for U.S. Appl. No. 12/096,591, mailed Mar. 27, 2013, 16 pages.
USPTO Non-Final Office Action for U.S. Appl. No. 13/957,810, mailed Apr. 17, 2015, 6 pages.
USPTO Non-final Office Action for U.S. Appl. No. 13/957,810, mailed Nov. 27, 2013, 18 pages.
Notice of Allowance for U.S. Appl. No. 13/957,810, mailed Jun. 8, 2015, 10 pages.
USPTO Non-Final Office Action mailed Jan. 4, 2016 in U.S. Appl. No. 14/529,134, filed Oct. 30, 2014 (65 pgs).
Trivinci Systems, LLC, "Race-Keeper System User Guide", V1.1.02, Jan. 2011, p. 21.
PCT International Search Report and Written Opinion for PCT/US15/60721 dated Feb. 26, 2016, 11 pages.
PCT International Search Report and Written Opinion for PCT/IB16/51863, dated Sep. 16, 2016.

US 9,594,371 B1

SYSTEM AND METHOD TO DETECT EXECUTION OF DRIVING MANEUVERS

RELATED APPLICATION

This application is a continuation application of and claims priority to U.S. application Ser. No. 14/186,416, filed Feb. 21, 2014, which is expressly incorporated by reference herein in its entirety.

FIELD

This disclosure relates to a system and method for detecting execution of driving maneuvers based on pre-determined driving maneuver profiles.

BACKGROUND

Systems configured to record, store, and transmit video, audio, and sensor data associated with a vehicle responsive to an accident involving the vehicle are known. Typically, such systems detect an accident based on data from a single sensor such as an accelerometer mounted on the vehicle. The video from the accident is usually analyzed by a user at a later time after the accident. Vehicle Engine Control Module (ECM) systems are known. Such systems interface with external computers (e.g., at an automobile mechanic) where the data stored by the ECM system is analyzed.

SUMMARY

One aspect of the disclosure relates to a system configured to detect execution of driving maneuvers by a vehicle. Some or all of the system may be installed in the vehicle and/or be otherwise coupled with the vehicle. In some implementations, the system may detect execution of driving maneuvers by the vehicle based on pre-determined driving maneuver profiles. The system may include one or more sensors configured to generate output signals conveying information related to the vehicle. In some implementations, the system may detect execution of the driving maneuvers by the vehicle based on a comparison of the information conveyed by the output signals from the sensors to criteria included in the pre-determined driving maneuver profiles. Advantageously, the system may identify dangerous driving maneuvers and/or other driving behavior in real-time or near real-time during operation of the vehicle based on the comparisons. In some implementations, the system may include one or more of a sensor, a processor, a user interface, electronic storage, a remote computing device, and/or other components.

The sensors may be configured to generate output signals conveying information related to the operation and/or the context of the vehicle. Information related to the operation of the vehicle may include feedback information from one or more of the mechanical systems of the vehicle, and/or other information. In some implementations, at least one of the sensors may be a vehicle system sensor included in an ECM system of the vehicle. Information related to the context of the vehicle may include information related to the environment in and/or around vehicle. In some implementations, the output signals conveying the information related to the context of the vehicle may be generated via non-standard aftermarket sensors installed in the vehicle. For example, one or more individual sensors may be and/or include an image sensor audio sensor. Based on an analysis of an image from this sensor, the system may automatically, using algorithms, determine that the vehicle is moving forward, is in reverse, has maneuvered outside of its lane of traffic, is making a turn, and/or other maneuvers. This example sensor may be one of a plurality of sensors in the system.

One or more processors may be configured to execute one or more computer program modules. The computer program modules may comprise one or more of a parameter module, a profile module, a maneuver trigger module, a control module, and/or other modules.

The parameter module may be configured to determine one or more vehicle parameters of the vehicle. The parameter module may determine the vehicle parameters based on the information conveyed by the output signals from the sensors and/or other information. The one or more vehicle parameters may be related to the operation of the vehicle, the context of the vehicle, physical characteristics of the vehicle, and/or other information. In some implementations, the parameter module may be configured to determine one or more of the vehicle parameters one or more times in an ongoing manner during operation of the vehicle.

The profile module may be configured to obtain one or more pre-determined driving maneuver profiles. The pre-determined driving maneuver profiles may describe driving maneuvers associated with dangerous driving behavior, for example, and/or other driving behavior. The one or more pre-determined driving maneuver profiles may include criteria sets associated with the driving maneuvers. The criteria sets may include one or more individual criteria characterizing a specific driving maneuver. For example, the specific driving maneuvers may include swerving, a U-turn, free-wheeling, over-revving, lane-departure, short following distance, imminent collision, unsafe turning that approaches rollover and/or vehicle stability limits, hard braking, and/or other driving maneuvers.

Criteria sets for maneuvers may be automatically and/or manually adjusted to accommodate for a vehicle type. For example, the system may determine that the vehicle is loaded (as described herein) and adjusted criteria sets for various maneuver settings based on the vehicle being loaded. The system may calibrate throttle, RPM, engine load, and/or other factors to dynamically adjust maneuver trigger points (criteria sets), for example.

The maneuver trigger module may be configured to detect execution, by the vehicle, of a specific driving maneuver. The maneuver trigger module may be configured to detect execution of a specific driving maneuver in real-time or near real-time. The maneuver trigger module may be configured to detect execution of a specific driving maneuver based on the information conveyed by the output signals generated by the sensors, the vehicle parameters determined by the parameter module, the pre-determined driving maneuver profiles obtained by the profile module, and/or based on other information. A specific driving maneuver may be detected based on the determined vehicle parameters and the obtained pre-determined driving maneuver profiles by comparing the determined vehicle parameters to the criteria sets such that a first specific driving maneuver is detected responsive to the determined parameters satisfying one or more individual criteria in a first criteria set associated with the first specific driving maneuver.

The control module may be configured to facilitate wireless communication of information conveyed by the output signals, the determined parameters, information identifying the specific driving maneuvers detected by the maneuver trigger module, and/or other information to the remote computing device and/or other devices. The control module may be configured to facilitate communication responsive to the detection of a specific driving maneuver. The control module may be configured to facilitate communication in real-time or near real-time. The control module may be configured to facilitate wireless communication of the information conveyed by the output signals, the determined parameters, the information identifying the specific driving maneuvers, and/or other information from a period of time that includes at least the specific driving maneuver.

In some implementations, the control module may be configured to facilitate recording event data based on detection of driving maneuvers. Event data may include video, audio, ECM, metadata, and/or other sensor data for a period of time that lasts from before a given driving maneuver starts until after it ends. The period of time for which data is recorded may be determined based on the timing of the maneuver, the point in time at which the maneuver is detected, the type of maneuver, and/or other information.

In some implementations, the control module may be configured to selectively determine one or more types of data that are recorded based on individual maneuvers. For example, the control module may selectively determine whether to record one or more types of video data, audio data, ECM data, and/or other sensor data. Continuing with the example, if the detected maneuver involved a vehicle moving in reverse, the control module may cause a video stream from a rear-facing camera to be included in the event record, whereas the view from the rear-facing camera may not be needed when recording events for other (non-reversing) maneuvers.

In some implementations, the control module may be configured to determine how much of the event data (video, audio, sensor, etc.) to record before the maneuver (e.g., pre-maneuver duration) and after the maneuver (e.g. post-maneuver) based on the maneuver itself. This may allow the event data to show a relevant and/or desired time frame. For example, if the maneuver lasted 10 seconds and the detection point is at the end of the maneuver, post-trigger duration may be 10 seconds and pre-trigger duration may be 20 seconds such that the maneuver is properly centered within the recorded event data (in the resulting 30 second event, the maneuver start 10 seconds into the event, and ends 20 seconds into the event). Similarly, in the case of a maneuver that results in a collision, which is detected at a point in time, the system may be configured to record data for a longer time interval before the maneuver detection point (so as to understand what led to the collision), for example about 1 minute, while the time interval after the trigger point may be much shorter, for example about 10 seconds, because the focus of a later analysis may be on understanding the causes of collisions (for the purposes of prevention of future collisions), rather than understanding the effects (after) of the collision.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
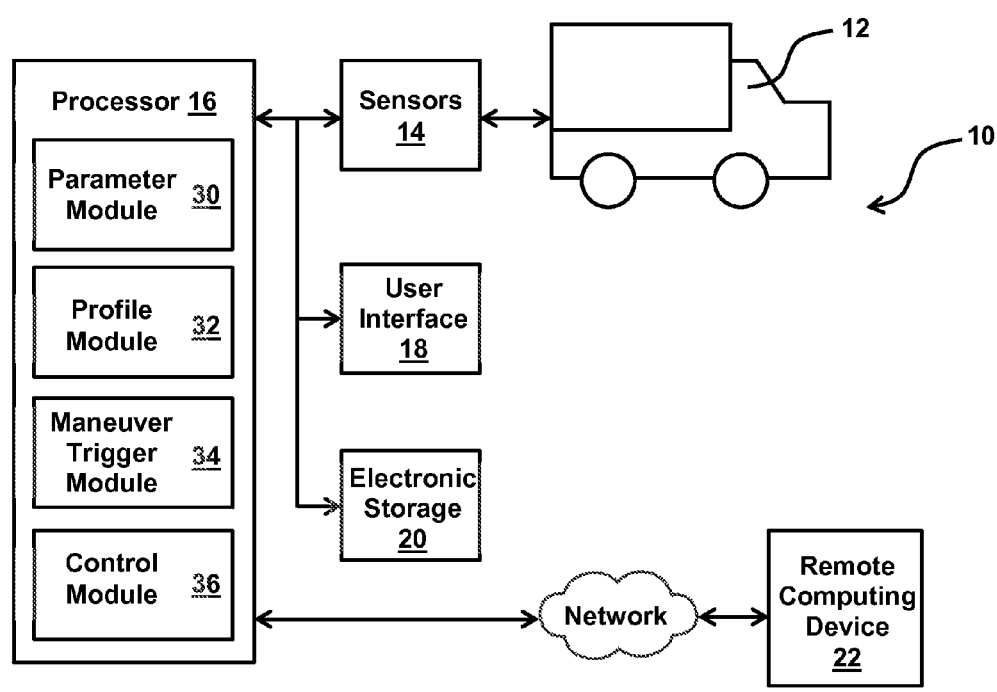
FIG. 1 illustrates a system configured to detect execution of driving maneuvers by a vehicle.

FIG. 1 illustrates a system 10 configured to detect execution of driving maneuvers by a vehicle 12. Some or all of system 10 may be installed in vehicle 12 and/or be otherwise coupled with vehicle 12. In some implementations, system 10 may detect execution of driving maneuvers by vehicle 12 based on pre-determined driving maneuver profiles. System 10 may include one or more sensors 14 configured to generate output signals conveying information related to vehicle 12. In some implementations, system 10 may detect execution of the driving maneuvers by vehicle 12 based on a comparison of the information conveyed by the output signals from sensors 14 to criteria included in the pre-determined driving maneuver profiles. In some implementations, system 10 may detect execution of the driving maneuvers based on a comparison of parameters determined from the information in the output signals to the criteria. Advantageously, system 10 may identify dangerous driving maneuvers and/or other driving behavior in real-time or near real-time during operation of vehicle 12 based on the comparisons. In some implementations, system 10 may include one or more of sensors 14, a processor 16, a user interface 18, electronic storage 20, a remote computing device 22, and/or other components.

In some implementations, one or more of the components of system 10 may form at least a portion of a vehicle event recorder system such as the vehicle event recorder system described in U.S. patent application Ser. No. 11/377,167 filed Mar. 16, 2006 and entitled, "Vehicle Event Recorder Systems And Networks Having Integrated Cellular Wireless Communications Systems", which is incorporated herein by reference.

One or more sensors 14 may be configured to generate output signals conveying information related to the operation and/or the context of vehicle 12. Information related to the operation of vehicle 12 may include feedback information from one or more of the mechanical systems of vehicle 12, and/or other information. The mechanical systems of vehicle 12 may include, for example, the engine, the drive train, the lighting systems (e.g., headlights, brake lights), the braking system, the transmission, fuel delivery systems, and/or other mechanical systems. The mechanical systems of vehicle 12 may include one or more mechanical sensors, electronic sensors, and/or other sensors that generate the output signals (e.g., seat belt sensors, tire pressure sensors, etc.). In some implementations, at least one of sensors 14 may be a vehicle system sensor included in an ECM system of vehicle 12.

Information related to the context of vehicle 12 may include information related to the environment in and/or around vehicle 12. The vehicle environment may include spaces in and around an interior and an exterior of vehicle 12. The information related to the context of vehicle 12 may include information related to movement of vehicle 12, an orientation of vehicle 12, a geographic position of vehicle 12, a spatial position of vehicle 12 relative to other objects, a tilt angle of vehicle 12, an inclination/declination angle of vehicle 12, and/or other information. In some implementations, the output signals conveying the information related to the context of vehicle 12 may be generated via non-standard aftermarket sensors installed in vehicle 12. The non-standard aftermarket sensor may include, for example, a video camera, a microphone, an accelerometer, a gyroscope, a geolocation sensor (e.g., a GPS device), a radar detector, a magnetometer, radar (e.g. for measuring distance of leading vehicle), and/or other sensors. In some implementations, the one or more sensors may include multiple cameras positioned around the vehicle and synchronized together to provide a 360 degree view of the inside of the vehicle and a 360 degree view of the outside of the vehicle.

Although sensors 14 are depicted in FIG. 1 as a single element, this is not intended to be limiting. Sensors 14 may include one or more sensors located adjacent to and/or in communication with the various mechanical systems of vehicle 12, in one or more positions (e.g., at or near the front of vehicle 12) to accurately acquire information representing the vehicle environment (e.g. visual information, spatial information, orientation information), and/or in other locations. For example, in some implementations, system 10 may be configured such that a first sensor is located near/in communication with a rotating tire of vehicle 12, and a second sensor located on top of vehicle 12 is in communication with a geolocation satellite. In some implementations, sensors 14 are configured to generate output signals continuously during operation of vehicle 12.

As shown in FIG. 1, processor 16 may be configured to execute one or more computer program modules. The computer program modules may comprise one or more of a parameter module 30, a profile module 32, a maneuver trigger module 34, a control module 36, and/or other modules.

Parameter module 30 may be configured to determine one or more vehicle parameters of vehicle 12. Parameter module 30 may determine the vehicle parameters based on the information conveyed by the output signals from sensors 14, information provided by external systems and/or databases, and/or other information. The one or more vehicle parameters may be related to the operation of vehicle 12, the context of vehicle 12, and/or other information. For example, the one or more vehicle parameters may be related to one or more of an acceleration, a direction of travel, a turn diameter, a vehicle speed, an engine speed (e.g. RPM), a duration of time, a closing distance, a lane departure from an intended travelling lane of the vehicle, a following distance, physical characteristics of vehicle 12 (such as mass and/or number of axles, for example), a tilt angle of vehicle 12, an inclination/declination angle of vehicle 12, and/or other parameters.

The physical characteristics of vehicle 12 may be physical features of vehicle 12 set during manufacture of vehicle 12, during loading of vehicle 12, and/or at other times. For example, the one or more vehicle parameters may include a vehicle type (e.g., a car, a bus, a semi-truck, a tanker truck), a vehicle size (e.g., length), a vehicle weight (e.g., including cargo and/or without cargo), a number of gears, a number of axles, a type of load carried by vehicle 12 (e.g., food items, livestock, construction materials, hazardous materials, an oversized load, a liquid), vehicle trailer type, trailer length, trailer weight, trailer height, a number of axles, and/or other physical features.

In some implementations, parameter module 30 may determine the one or more vehicle parameters based on the output signals from at least two different sensors. For example, parameter module 30 may determine one or more of the vehicle parameters based on output signals from a sensor 14 related to the ECM system and an external aftermarket added sensor 14. In some implementations, a determination of one or more of the vehicle parameters based on output signals from at least two different sensors 14 may be more accurate and/or precise than a determination based on the output signals from only one sensor 14. For example, on an icy surface, output signals from an accelerometer may not convey that a driver of vehicle 12 is applying the brakes of vehicle 12. However, a sensor in communication with the braking system of vehicle 12 would convey that the driver is applying the brakes. Parameter module 30 may determine a value of a braking parameter based on the braking sensor information even though the output signals from the accelerometer may not convey that the driver is applying the brakes.

Parameter module 30 may determine vehicle parameters that are not directly measurable by any of the available sensors. For example, an inclinometer may not be available to measure the road grade, but vehicle speed data as measured by a GPS system and/or by a wheel sensor ECM may be combined with accelerometer data to determine the road grade. If an accelerometer measures a force that is consistent with braking, but the vehicle speed remains constant, the parameter module can determine that the measured force is a component of the gravity vector that is acting along the longitudinal axis of the vehicle. By using trigonometry, the magnitude of the gravity vector component can be used to determine the road grade (e.g., pitch angle of the vehicle in respect to the horizontal plane).

In some implementations, parameter module 30 may be configured to determine one or more of the vehicle parameters one or more times in an ongoing manner during operation of vehicle 12. In some implementations, parameter module 30 may be configured to determine one or more of the vehicle parameters at regular time intervals during operation of vehicle 12. The timing of the vehicle parameter determinations (e.g., in an ongoing manner, at regular time intervals, etc.) may be programmed at manufacture, obtained responsive to user entry and/or selection of timing information via user interface 18 and/or remote computing device 22, and/or may be determined in other ways. The time intervals of parameter determination may be significantly less (e.g. more frequent) than the time intervals at which various sensor measurements are available. In such cases, parameter module 30 may estimate vehicle parameters in between the actual measurements of the same vehicle parameters by the respective sensors, to the extent that the vehicle parameters are measurable. This may be established by means of a physical model that describes the behavior of various vehicle parameters and their interdependency. For example, a vehicle speed parameter may be estimated at a rate of 20 times per second, although the underlying speed measurements are much less frequent (e.g., four times per second for ECM speed, one time per second for GPS speed). This may be accomplished by integrating vehicle acceleration, as measured by the accelerometer sensor where the measurements are available 1000 times per second, across time to determine change in speed which is accumulated over time again for the most recent vehicle speed measurement. The benefit of these more frequent estimates of vehicle parameters are many and they include improved operation of the maneuver detection module 34, reduced complexity of downstream logic and system design (e.g., all vehicle parameters are updated at the same interval, rather than being updating irregularly and at the interval of each respective sensor), and more pleasing (e.g., "smooth") presentation of vehicle event recorder data in an event player apparatus.

Profile module 32 may be configured to obtain one or more pre-determined driving maneuver profiles. The pre-determined driving maneuver profiles may describe driving maneuvers associated with dangerous driving behavior, for example, and/or other driving behavior. The pre-determined driving maneuver profiles may be programmed at manufacture, obtained by profile module 32 responsive to user entry and/or selection of information related to pre-determined driving maneuver profiles via user interface 18 and/or remote computing device 22, obtained from electronic storage 20, and/or may be obtained in other ways. The one or more pre-determined driving maneuver profiles may include criteria sets associated with the driving maneuvers. The criteria sets may include one or more individual criteria characterizing a specific driving maneuver. In some implementations, profile module 32 may be configured such that, for example, a first individual criterion and a second individual criterion for a first pre-determined driving maneuver profile are associated with information conveyed by output signals from at least two different sensors.

In some implementations, profile module 32 may be configured such that the pre-determined driving maneuver profiles describe one or more geo-fences. An individual geo-fence may be a virtual boundary line that defines, represents, and/or is otherwise related to a physical area (e.g., a storage yard where fleet vehicles are stored), a point of interest, a segment of a road/highway/etc., and/or other physical locations. Geo-fences may define areas where a particular maneuver is allowed. Geo-fences may define areas where a particular driving maneuver is disallowed and/or particularly dangerous (e.g., a narrow country road). Specific geo-fences may be associated with specific driving maneuvers. For example, idling may be permissible in a geo-fenced area where a U-turn is not permissible. In some implementations, geo-fences may be associated with a time of day. For example, a geo-fence may surround a large parking lot at a mall. The geo-fence may apply only during hours that the mall is open, and not, for example, during the early morning or late night hours.

By way of a non-limiting example, the specific driving maneuvers may include swerving, a U-turn, freewheeling, over-revving, lane-departure, short following, imminent collision, hard braking, rapid acceleration, and/or other driving maneuvers. Swerving may indicate an unsafe lane change and/or other abrupt lateral movements of vehicle 12. Swerving may be characterized by criteria including a first lateral acceleration force in a first direction followed by a second lateral acceleration force in a second direction, for example. A first lateral acceleration in a first direction followed by a second lateral acceleration in a second direction may differentiate a swerve from a hard turn. The swerving criteria may include direction criteria that specify that the second swerve direction is substantially opposite the first swerve direction and timing criteria that specify that the second acceleration must follow the first acceleration within a given period of time. The swerving criteria may include minimum vehicle speed criterion (e.g., 25 miles per hour) that needs to be satisfied before a swerve trigger can be activated. The swerving criteria may include a factor by which the first and second lateral force criteria are reduced gradually as the vehicle speed exceeds a predefined threshold and continues to increase. This would reflect that fact that the higher the vehicle speed, abrupt lane changes (e.g. as when a vehicle swerves to avoid a collisions) become more problematic and risky.

U-turns may be risky maneuvers for large trucks, for example. A U-turn may be characterized by criteria including a turn diameter, a total distance travelled while turning, an angular change in direction, and/or other criteria. In some implementations, U-turns and/or other driving maneuvers may be triggered at least in part based on a current location of the vehicle, the specific driving maneuver detected, and the pre-determined geo-fences related to that maneuver. For example, system 10 may identify locations where it would not trigger an event (e.g., U-turn) and/or filter that event based on a current location of the vehicle and a maneuver type. For example in the parking lot around a distribution center with a large section of open pavement it may be acceptable for the driver to perform a U-turn given that specific location. This discussion of U-turns and geo-fences is not intended to be limiting. Geo-fences and maneuver detection/filtering may apply similarly to the other driving maneuvers described herein and/or other driving maneuvers.

Freewheeling may describe vehicle 12 moving without the drive train of vehicle 12 being coupled to the engine (e.g., in neutral). Freewheeling may be characterized by criteria including a speed of vehicle 12, an engine RPM level relative to the speed, time duration at the RPM level, and/or other criteria.

Over-revving the engine of vehicle 12 may harm the engine and/or waste fuel, for example. Over-revving may be characterized by criteria including the engine RPM level of vehicle 12, a duration time at the RPM level, and/or other criteria.

Lane departure may occur when the driver of vehicle 12 is inattentive and/or drowsy, for example. Lane-departure may be characterized by vehicle 12 leaving an intended roadway travelling lane more than a given number of times during a given time period, and/or other criteria.

Short following may be characterized by criteria including a following distance between vehicle 12 and a second vehicle immediately in front of vehicle 12, time duration at the following distance, and/or other criteria.

Imminent collision may indicate that vehicle 12 is likely to collide with one or more other objects unless immediate evasive action is taken. Imminent collision may be characterized by criteria including a speed of vehicle 12, a closing distance of vehicle 12 relative to one or more other objects, and/or other criteria.

In some implementations, profile module 32 may be configured to scale one or more of the individual criteria in the pre-determined driving maneuver profiles based on the output signals from sensors 14, the vehicle parameters determined by parameter module 30, and/or based on other information. For example, profile module 32 may be configured to scale the individual criteria for short following based on the type of load carried by vehicle 12 (e.g., a liquid, a solid material, a hazardous material). Responsive to vehicle 12 carrying a hazardous material, profile module 32 may scale the following distance criteria to a larger value (e.g., more distance between vehicles). As another example, acceleration criteria for a swerve may be scaled with the speed of vehicle 12. In some implementations, profile module 32 may be configured to scale the individual criteria based on information related to the current roadway travelled by vehicle 12. For example, output signals from a geolocation sensor may convey information indicating an upcoming sharp turn in the roadway. Profile module 32 may scale speed criteria in one or more of the pre-determined driving maneuver profiles based on the upcoming sharp turn.

Maneuver trigger module 34 may be configured to detect execution, by vehicle 12, of a specific driving maneuver. Maneuver trigger module 34 may be configured to detect execution of a specific driving maneuver in real-time or near real-time. Maneuver trigger module 34 may be configured to detect execution of a specific driving maneuver based on the information conveyed by the output signals generated by sensors 14, the vehicle parameters determined by parameter module 30, the pre-determined driving maneuver profiles obtained by profile module 32, and/or based on other information. A specific driving maneuver may be detected based on the determined vehicle parameters and the obtained pre-determined driving maneuver profiles by comparing the determined vehicle parameters to the criteria sets such that a first specific driving maneuver (e.g., a U-turn) is detected responsive to the determined parameters satisfying one or more individual criteria (e.g., a turn diameter) in a first criteria set associated with the first specific driving maneuver. In some implementations, maneuver trigger module 34 may be configured to filter the detected driving maneuvers based on the pre-determined geo-fences and/or other information. Other information may include, for example, information generated by a remote reviewer located in a review center viewing video data in real-time and/or at a later time. The remote reviewer may note that a specific driving maneuver has occurred but the noted maneuver may be filtered out because the maneuver occurred inside a geo-fenced area where the specific maneuver is permissible.

Figure 2:
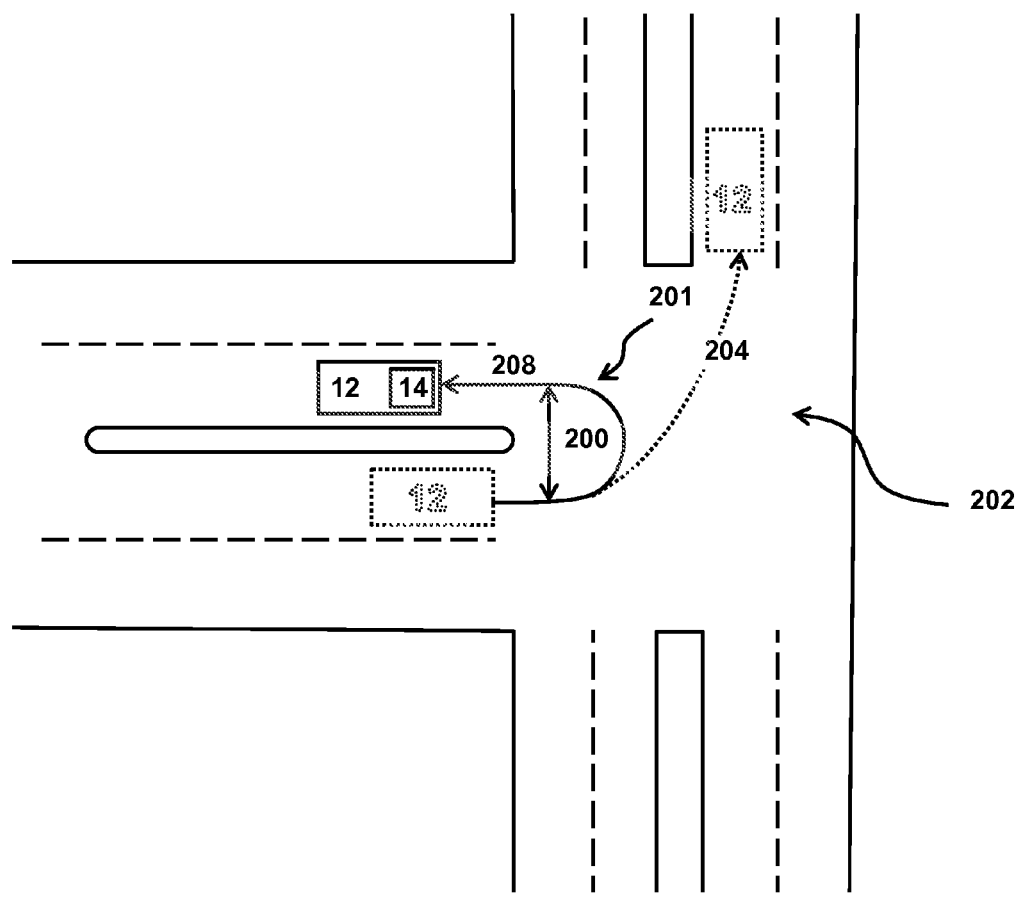
FIG. 2 illustrates a turn diameter of a U-turn made by the vehicle in an intersection.

As described above, the specific driving maneuvers may include swerving, a U-turn, freewheeling, over-revving, lane-departure, short following, imminent collision, hard braking, rapid acceleration, and/or other driving maneuvers. By way of a non-limiting example, FIG. 2 illustrates a turn diameter 200 of a U-turn 201 made by vehicle in an intersection 202 (e.g., a non-geo-fenced area). Output signals conveying information related to turn diameter 200 may be generated by a geolocation sensor (e.g., a GPS device) and/or other sensors (e.g., sensors 14). Parameter module 30 (shown in FIG. 1) may determine turn diameter 200, the total distance 208 travelled during the turn, the angular change in direction of vehicle 12, and/or other parameters based on the output signals. Parameter module 30 (FIG. 1) may receive geolocation heading information (e.g., latitude and/or longitude) of vehicle 12 conveyed by the output signals from the geolocation sensor and determine turn diameter 200, total distance 208, the angular change in direction of vehicle 12, and/or other parameters based on the geolocation heading information. As shown in FIG. 2, turn diameter 200 is smaller than the diameter of other turns that could have been made (e.g., left turn 204) by vehicle 12 through intersection 202.

U-turn 201 may be detected by maneuver trigger module 34 (FIG. 1) based on determined turn diameter 200, total distance 208, the angular change in direction, the U-turn diameter criteria in the pre-determined driving maneuver profile for a U-turn, and/or other information. Maneuver trigger module 34 may compare determined turn diameter 200 to the turn diameter criteria (e.g., less than about 45 meters), total distance 208 to the total distance criteria (e.g., less than about 45 meters), the angular change in direction of vehicle 12 to the angular change in direction criteria (e.g., greater than about 175 degrees), and/or other criteria obtained by profile module 32 (FIG. 1) to determine whether turn diameter 200, total travel distance 208, and/or the angular change in direction of vehicle 12 indicates a U-turn.

In some implementations, U-turn 201 may be detected responsive to the U-turn criteria being satisfied within a given period of time after detection of the start of a turn. In some implementations, maneuver trigger module 34 may determine whether the U-turn criteria have been met within a period of time of about 50 seconds, for example, after the start of the turn.

As described above, maneuver trigger module 34 may be configured to detect maneuvers based on GPS location information for the vehicle during the specific maneuver. GPS location information may allow maneuver trigger module 34 to distinguish between a cloverleaf turn and a U-turn, for example. System 10 may be configured to differentiate a cloverleaf turn from a U-turn based on turn diameter and adjust maneuver criteria sets accordingly. For a U-turn, system 10 may adjust the information saved so that the timing of the saved information is not based on the moment the maneuver is detected but rather a timing of a determined apex of the turn. Information is saved for the periods of time before and after the apex of the U-turn. In this example, system 10 may not determine that a U-turn maneuver has been completed until 25 seconds (for example) have passed so the system backs up 20 seconds (for example) to the timing of the apex of the turn and saves information from before and after that point in time. Timing of saving information is described in more detail below (e.g., see the description of control module 36).

Returning to FIG. 1, it should be noted that the specific criteria values provided herein for the U-turn example (described above with respect to FIG. 2) and the other examples of driving maneuver criteria (described below) are not intended to be limiting. They are being used as examples only. The individual criteria used to determine the specific driving maneuvers may have any values that allow system 10 to function as described herein. For example, at least some of the example values may be significantly larger and/or smaller than the recited example values and system 10 may still function as described. The criteria in the pre-determined driving maneuver profiles may be programmed to different values at manufacture, changed to other values via entry and/or selection of information related to the pre-determined driving maneuver profiles via user interface 18 and/or remote computing device 22, scaled to other values by profile module 32, and/or may be changed in other ways.

By way of a second non-limiting example, profile module 32 and/or maneuver trigger module 34 may be configured such that lateral forces of about −0.3 g (e.g., swerve left) and/or about +0.3 g (e.g., swerve right) may be the lateral force criteria used to detect a swerve. In some implementations, the −0.3 g and/or +0.3 g criteria may be used at vehicle 12 speeds less than about 10 kph. The −0.3 g and/or +0.3 g criteria may be scaled as vehicle 12 increases in speed. In some implementations, the −0.3 g and/or +0.3 g criteria may be scaled (e.g., reduced) by about 0.0045 g per kph of speed over kph. To prevent too much sensitivity, profile module 32 may limit the lateral force criteria to about +/−0.12 g, regardless of the speed of vehicle 12, for example. In some implementations, the criterion for the given period of time between swerves may be about 3 seconds.

(47) In some implementations, specific driving maneuvers may be detected based on one or more of a vehicle speed, an engine load, a throttle level, vehicle direction, a gravitational force, and/or other parameters being sustained at or above threshold levels for pre-determined amounts of time. In some implementations, an acceleration and/or force threshold may be scaled based on a length of time an acceleration and/or force is maintained, and/or the particular speed the vehicle is travelling. System 10 may be configured such that force maintained over a period of time at a particular vehicle speed may decrease a threshold force the longer that the force is maintained. System 10 may be configured such that, combined with engine load data, throttle data may be used to determine a risky event, a fuel wasting event, and/or other events.

For example, a sensor output signal signature for a clover leaf turn may be identified by a smaller g force that is sustained for a given period of time. (In some implementations, this smaller sustained g force may be combined with other information such as engine load and/or other vehicle data). In some implementations, a 0.3 g side impact/acceleration may normally trigger the camera and/or other devices to record an event (as described above). In addition, a 0.1 g side impact/acceleration (below the usual 0.3 g threshold) that is sustained for 10 seconds (for example) while the vehicle is travelling at 38 MPH (for example), may trigger the camera, even though the 0.3 g threshold was never exceeded. These factors may indicate a clover leaf turn. It may be desirable to detect such situations because this sustained force for a class 8 vehicle, for example, can be very dangerous and/or indicative of a potential rollover situation.

By way of a third non-limiting example, freewheeling may be detected by maneuver trigger module 34 responsive to a speed of vehicle 12 satisfying the freewheeling speed criteria and an engine RPM level of vehicle 12 satisfying the engine RPM criteria. The engine RPM may satisfy the engine RPM criteria for a duration of time that satisfies the freewheeling time duration criteria. In some implementations, freewheeling may be detected at speeds greater than or equal to about 30 kph. In some implementations, freewheeling may be ignored at speeds below about 30 kph. When the speed of vehicle 12 is above about 30 kph, freewheeling may be detected responsive to the engine RPM remaining below about 1000 RPM for less than or equal to about 5 seconds.

By way of a fourth non-limiting example, over-revving may be detected by maneuver trigger module 34 responsive to an engine RPM level of vehicle 12 satisfying the over-revving engine RPM criteria for a duration time that satisfies the duration time criteria. In some implementations, over-revving may be detected by maneuver trigger module 34 responsive to an engine RPM level of vehicle 12 remaining over about 5000 RPM for greater than or equal to about 2 seconds. In some implementations, over-revving may be detected by maneuver trigger module 34 based on other data such as engine load, incline of the vehicle, throttle position, and/or other information to determine accurately the level of over revving for the operating condition of the vehicle.

By way of a fifth non-limiting example, lane-departure may be detected by maneuver trigger module 34 responsive to vehicle 12 leaving an intended roadway travelling lane more than the given number of times specified by the lane-departure criteria during the given time period specified by the lane-departure criteria. In some implementations, lane departure may be detected responsive to vehicle 12 leaving an intended roadway travelling lane more than about 3 times in about 60 seconds. It should be noted that this is only one example, and depending on the vehicle and/or how the vehicle operates, these settings may be changed.

By way of a sixth non-limiting example, short following may be detected by maneuver trigger module 34 responsive to a following distance between vehicle 12 and a second vehicle immediately in front of vehicle 12 being maintained for a time duration that satisfies the following distance criteria. In some implementations, short following may be detected responsive to the following distance between vehicle 12 and a vehicle immediately in front of vehicle 12 meeting the following distance criteria for a period of time greater than or equal to about 10 seconds. The 10 second time period may be an example amount of time that may allow for brief periods of insufficient distance between vehicle 12 and the other vehicle which may occur when the other vehicle pulls in front of vehicle 12, reducing the following distance before the driver of vehicle 12 has a chance to re-establish a safe following distance. In some implementations, the short following distance threshold may be a distance between vehicles that corresponds to a 1.6 second travel time. For example, a second car may pass by a reference location about 1.6 seconds after a first car passes the reference location. The short following distance threshold may be the distance covered by the second car in the 1.6 seconds. The 1.6 second travel time is not intended to be limiting. The short following distance threshold may be set to any value that allows the system to function as described herein.

By way of a seventh non-limiting example, imminent collision may be detected by maneuver trigger module 34 responsive to a speed of vehicle 12, a closing distance of vehicle 12 relative to one or more other objects, and/or other parameters satisfying the speed, closing distance, and/or other criteria. In some implementations, imminent collision may be detected responsive to the speed of vehicle 12 being at or above about kph (e.g., to prevent inadvertent triggers in slow and/or stop-and-go traffic).

In some implementations, imminent collision may be detected based on a "Forward Collision Warning" message that is transmitted over the vehicle bus/ECM. The forward collision message may be a binary indicator variable (e.g., warning or no warning). In some implementations, a third party active safety system may generate the forward collision message. The third party active safety system may calculate and/or otherwise determine the acceleration required to stop the vehicle from its current speed (e.g., 30 kph or 8.33 m/sec) within a specified distance (e.g., 50 meters). This may be derived, for example, based on a physics formula, $v^2=2\,(a)\,(d)$, where "v" is the starting speed, "a" is deceleration, and "d" is stopping distance. In this example, $a=v^2/(2\,d)$ or $8.33^2/(2*50)=0.69$ g, which may be deemed as excessive deceleration required to stop the vehicle. (For example, 0.5 g may be considered to be hard acceleration for heavy vehicles).

Control module 36 may be configured to trigger event recording (e.g., recording of video, audio, ECM, metadata, and/or other sensor data associated with a maneuver) based on maneuver detection. Event data may include video, audio, ECM, metadata, and/or other sensor data for a period of time that lasts from before a given driving maneuver starts until after it ends. The period of time for which data is recorded may be determined based on the timing of the maneuver, the point in time at which the maneuver is detected, and/or other information. Control module 36 may be configured to trigger recording of substantially all event data (e.g., video, audio, sensor output signals, etc.), and not just the signals and/or parameters used for maneuver detection. Control module 36 may be configured such that the event data is saved to a non-volatile memory (e.g., included in electronic storage 20) and later offloaded wirelessly via a vehicle event recorder system such as the vehicle event recorder system described in U.S. patent application Ser. No. 11/377,167 filed Mar. 16, 2006 and entitled, "Vehicle Event Recorder Systems And Networks Having Integrated Cellular Wireless Communications Systems" (incorporated by reference above), and/or the vehicle event recorder system described in U.S. patent application Ser. No. 11/377,157 filed Mar. 16, 2006 and entitled, "Vehicle Event Recorder Systems and Networks Having Parallel Communications Links," which is incorporated herein by reference.

In some implementations, control module 36 may be configured to selectively determine one or more types of data that are recorded based on individual maneuvers. For example, control module 36 may selectively determine whether to record one or more types of video data, audio data, ECM data, and/or other sensor data. Continuing with the example, if the detected maneuver involved a vehicle moving in reverse, the control module may cause a video stream from a rear-facing camera to be included in the event record, whereas the view from the rear-facing camera may not be needed when recording events for other (non-reversing) maneuvers. In some implementations, control module 36 may be configured such that, based on ECM, image analysis, and/or other information, active cameras recording the maneuver may change. For example, the system may determine, based on image and\or ECM information, that the vehicle is moving in reverse. From that information control module 36 may determine that only (for example) information from driver facing, side, and/or rear cameras will be saved for the maneuver, and/or only (for example) information from the driver and rear camera, rather than the driver and forward facing camera will be saved (similar to the example above).

Control module 36 may be configured to facilitate wireless communication of information conveyed by the output signals, the determined parameters, information identifying the specific driving maneuvers detected by maneuver trigger module 34, and/or other information to remote computing device 22 and/or other devices. Control module 36 may be configured to facilitate communication responsive to the detection of a specific driving maneuver. The information identifying the specific driving maneuvers detected by maneuver trigger module 34 may include, for example, the one or more vehicle parameters that satisfied the criteria in the pre-determined driving maneuver profiles, parameter values, the scaled criteria, and/or other information. For example, the information identifying a swerve detected by maneuver trigger module 34 may include the actual lateral force and the scaled criteria force value that caused maneuver trigger module 34 to detect the swerve.

Control module 36 may be configured to facilitate communication in real-time or near real-time. For example, control module 36 may facilitate one or more individual communications during operation of vehicle 12. Each individual communication may be responsive to a detected driving maneuver and may occur just after detection of an individual maneuver. In some implementations, control module 36 may be configured to facilitate communication after use of vehicle 12 has ceased such that the information conveyed by the output signals, the determined parameters, information identifying the specific driving maneuvers detected by maneuver trigger module 34, and/or other information is communicated in a single communication. In some implementations, control module 36 may be configured to associate visual information in the output signals of the one or more sensors (e.g., cameras) with information related to operation and/or context of the vehicle (e.g., vehicle system sensors and/or aftermarket sensors).

Control module 36 may be configured to facilitate storage and/or wireless communication of the information conveyed by the output signals, the determined parameters, the information identifying the specific driving maneuvers, and/or other information from a period of time that includes at least the specific driving maneuver. For example, control module 36 may facilitate communication of the information conveyed by the output signals, the determined parameters, and/or other information from a period of time that begins before the beginning of the detected driving maneuver, lasts throughout the maneuver, and ends after the end of the detected maneuver. Control module 36 may be configured such that the period of time that includes at least the specific driving maneuver is centered around the specific driving maneuver and includes a pre-maneuver time, the specific driving maneuver, and a post-maneuver time, wherein the pre-maneuver time and the post-maneuver time are approximately equal.

As described above, in some implementations, control module 36 may be configured to determine how much of the event data (video, audio, sensor, etc.) to record before the maneuver (e.g., pre-maneuver duration) and after the maneuver (e.g. post-maneuver) based on the maneuver itself. This may allow the event data to show a relevant and/or desired time frame. For example, if the maneuver lasted 10 seconds and the detection point is at the end of the maneuver, post-trigger duration may be 10 seconds and pre-trigger duration may be 20 seconds such that the maneuver is properly centered within the recorded event data (in the resulting 30 second event, the maneuver start 10 seconds into the event, and ends 20 seconds into the event). Similarly, in the case of a maneuver that results in a collision, which is detected at a point in time, the system may be configured to record data for a longer time interval before the maneuver detection point (so as to understand what led to the collision), for example about 1 minute, while the time interval after the trigger point may be much shorter, for example about 10 seconds, because the focus of a later analysis may be on understanding the causes of collisions (for the purposes of prevention of future collisions), rather than understanding the effects (after) of the collision.

In some implementations, control module 36 may be configured to facilitate electronic storage of the information conveyed by the output signals, the determined parameters, the information identifying the specific driving maneuvers detected by maneuver trigger module 34, and/or other information. Control module 36 may be configured to facilitate electronic storage responsive to the detection of the specific driving maneuver. Control module 36 may facilitate electronic storage of the information conveyed by the output signals, the determined parameters, the information identifying the specific driving maneuver, and/or other information, from the period of time that includes at least the specific driving maneuver. Control module 36 may facilitate electronic storage of the information in electronic storage 20, electronic storage included in remote computing device 22, and/or in other electronic storage.

For example, responsive to detection of a swerve by maneuver trigger module 34, control module 36 may be configured to facilitate wireless communication and/or electronic storage of the information conveyed by the output signals, the determined parameters, the information identifying the specific driving maneuvers detected by maneuver trigger module 34, and/or other information. The communicated and/or stored information may include, for example, video images showing vehicle 12 performing the specific driving maneuver, determined parameters that correspond to the video images, and/or other information.

In some implementations, control module 36 may be configured to facilitate temporary electronic storage of the information conveyed by the output signals, the determined parameters, the information identifying the specific driving maneuvers detected by maneuver trigger module 34, and/or other information in electronic storage 20 (as described above). Control module 36 may be configured to facilitate temporary electronic storage until the information is communicated to remote computing device 22. Control module 36 may be configured to erase the data temporarily stored in electronic storage 20 responsive to the communication to remote computing device 22.

In some implementations, control module 36 may cause user interface 18 to display an indication of the detected maneuver to a driver of vehicle 12 and/or other users of system 10. In some implementations, control module 36 may cause remote computing system 22 to display an indication of the detected maneuver to a driver of vehicle 12, and/or other users of system 10. The electronic indication may include, for example, an identification of the detected maneuver, information related to the one or more vehicle parameters that satisfied the criteria in a pre-determined driving maneuver profile, and/or other information.

In some implementations, control module 36 may be configured to cause one or more sensors 14 to operate continuously. For example, control module 36 may cause a video camera (e.g., sensor 14) to continuously generate video images of vehicle 12 and/or other vehicles. Control module 36 may be configured to cause system 10 to continuously buffer video, audio, sensor, and/or other data. Control module 36 may be configured such that once an event occurs, the buffered data related to the event is transferred from a volatile to a non-volatile memory. Control module 36 is configured such that a determination is made in real-time as to whether or not the data related to the event should be offloaded immediately or kept on the device as backup. Control module 36 may facilitate wireless communication of the video images in real-time to remote computing device 22. In some implementations, control module 36 may be configured to cause one or more sensors to operate at pre-determined intervals, responsive to detected driving maneuvers, and/or at other times.

Figure 3:
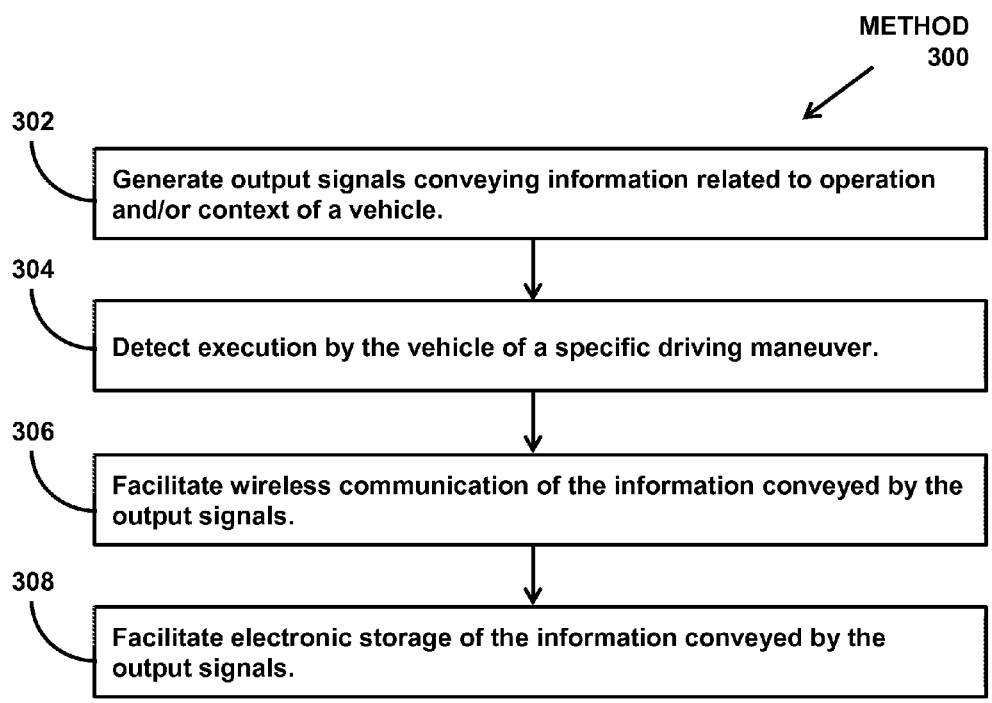
FIG. 3 illustrates a method to detect execution of driving maneuvers.
Figure 4:
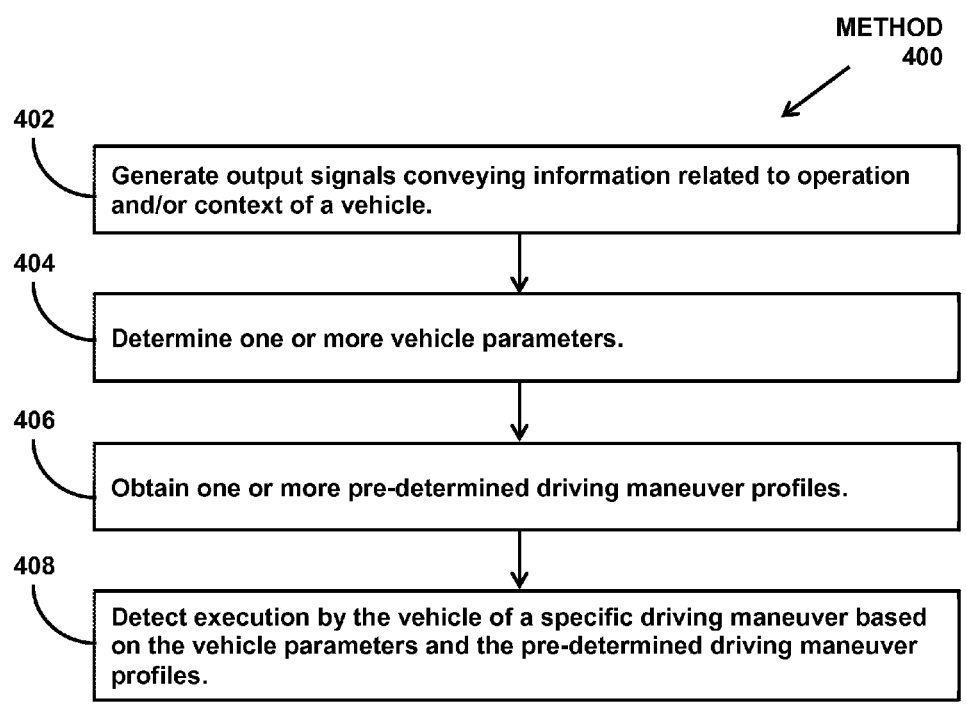
FIG. 4 illustrates another method to detect execution of driving maneuvers

FIG. 3 and FIG. 4 illustrate methods 300 and 400 to detect execution of driving maneuvers. The operations of method 300 and/or 400 presented below are intended to be illustrative. In some implementations, method 300 and/or 400 may be accomplished with one or more additional operations not described, and/or without one or more of the operations discussed. Additionally, the order in which the operations of method 300 and/or 400 are illustrated (in FIG. 3 and FIG. 4) and described below is not intended to be limiting. In some implementations, two or more of the operations may occur substantially simultaneously.

In some implementations, method 300 and/or 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 and/or 400 in response to instructions stored electronically on one or more electronic storage mediums. The one or more processing devices may include one or more devices configured through hardware, firmware, and/or software to be specifically designed for execution of one or more of the operations of method 300 and/or 400.

Referring to FIG. 3 and method 300, at an operation 302, output signals conveying information related to the operation of the vehicle, the context of the vehicle, and/or other information may be generated. In some implementations, generating output signals conveying information related to the operation and/or the context of the vehicle may include acquiring visual information representing the vehicle environment. The vehicle environment may include spaces in and around an interior and an exterior of the vehicle. In some implementations, the output signals may convey information related to mechanical systems of the vehicle. The output signals conveying information related to mechanical systems of the vehicle may be generated by one or more vehicle subsystem sensors included in a vehicle on-board data system. In some implementations, operation 302 may be performed by one or more sensors the same as or similar to sensors 14 (shown in FIG. 1 and described herein).

At an operation 304, execution by the vehicle of a specific driving maneuver may be detected. In some implementations, the specific driving maneuver may include a swerve, a U-turn, freewheeling, over-revving, lane-departure, short following, imminent collision, and/or other driving maneuvers. The detection may be in real-time or near real-time. The detection may be based on the information conveyed by the output signals from the one or more sensors and/or other information. In some implementations, operation 304 may be performed by a processor module the same as or similar to maneuver trigger module 34 (shown in FIG. 1 and described herein).

At an operation 306, wireless communication of the information conveyed by the output signals may be facilitated. The facilitation of the wireless communication may be in real-time or near real-time. The facilitation of the wireless communication may be responsive to the detection of the specific driving maneuver. The information conveyed by the output signals that is wirelessly communicated may include information for a period of time that includes at least the specific driving maneuver and/or other information. The information may include, for example, video and/or other data associated with an event and/or maneuver. In some implementations, operation 306 may be performed by a processor module the same as or similar to control module 36 (shown in FIG. 1 and described herein).

At an operation 308, electronic storage of the information conveyed by the output signals may be facilitated. Facilitation of the electronic storage may be responsive to the detection of the specific driving maneuver. The electronically stored information may include the information for the period of time that includes at least the specific driving maneuver and/or other information. In some implementations, operation 308 may be performed by a processor module and/or electronic storage the same as or similar to control module 36 and/or electronic storage 20 (shown in FIG. 1 and described herein).

Referring to FIG. 4 and method 400, at an operation 402, output signals conveying information related to the operation of a vehicle, the context of the vehicle, and/or other information may be generated. Operation 402 may include generating output signals conveying information related to one or more of mechanical systems of the vehicle, movement of the vehicle, an orientation of the vehicle, a geographic position of the vehicle, a spatial position of the vehicle relative to other objects, and/or other operational/contextual characteristics of the vehicle. In some implementations, operation 402 may be performed by one or more sensors the same as or similar to sensors 14 (shown in FIG. 1 and described herein).

At an operation 404, one or more vehicle parameters may be determined. The one or more vehicle parameters may be determined based on the output signals and/or other information. The one or more vehicle parameters may be related to the operation of the vehicle, the context of the vehicle, and/or other vehicle parameters. In some implementations, the one or more vehicle parameters may be determined one or more times in an ongoing manner during operation of the vehicle. In some implementations, operation 404 may be performed by a processor module the same as or similar to parameter module 30 (shown in FIG. 1 and described herein).

At an operation 406, one or more pre-determined driving maneuver profiles may be obtained. The one or more pre-determined driving maneuver profiles may include criteria sets associated with driving maneuvers. The one or more pre-determined driving maneuver profiles may include a first pre-determined driving maneuver profile having a first criteria set, for example. The first criteria set may include a first individual criterion and a second individual criterion. In some implementations, the first individual criterion and the second individual criterion for the first pre-determined driving maneuver profile may be associated with information conveyed by output signals from at least two different sensors.

In some implementations, operation 406 may include scaling the first individual criterion and/or the second individual criterion in the first pre-determined driving maneuver profile based on the output signals, the determined parameters, and/or other information. The scaling may be performed in real-time or near real-time during operation of the vehicle. In some implementations, operation 406 may be performed by a processor module the same as or similar to profile module 32 (shown in FIG. 1 and described herein).

At an operation 408, execution by the vehicle of a specific driving maneuver profile may be detected. The detection may be based on the vehicle parameters and the pre-determined driving maneuver profiles. Execution of the specific driving maneuver may be detected by comparing the determined vehicle parameters to the criteria sets such that, for example, a first specific driving maneuver is detected responsive to the determined parameters satisfying the first individual criterion and the second individual criterion. In some implementations, operation 408 may be performed by a processor module same as or similar to maneuver trigger module 34 (shown in FIG. 1 and described herein).

Returning to FIG. 1, user interface 18 is configured to provide an interface between system 10 and users through which the users may provide information to and receive information from system 10. This enables pre-determined profiles, criteria, data, cues, results, instructions, and/or any other communicable items, collectively referred to as "information," to be communicated between a user and one or more of processor 16, sensors 14, vehicle 12, remote computing device 22, and/or other components of system 10. As an example, a dangerous driving cue may be displayed to the driver of vehicle 12 via user interface 18.

In some implementations, a user interface may be included in remote computing device 22. In some implementations, remote computing device 22 performs these actions (e.g., changing criteria, selecting profiles, etc.) in an automated fashion and/or in response to the user input into remote computing device 22 rather than in response to direct user input through user interface 18. For example, a user may enter, select, and/or upload a predetermined profile using remote computing device 22. In some implementations, the system described herein achieves scalability by limiting the necessity for users to use user interface 18 separately at individual vehicles.

Examples of interface devices suitable for inclusion in user interface 18 and/or a user interface in remote computing device 22 comprise a keypad, buttons, switches, a keyboard, knobs, levers, a display screen, a touch screen, speakers, a microphone, an indicator light, an audible alarm, a printer, a tactile feedback device, and/or other interface devices. In one implementation, user interface 18 and/or the user interface in remote computing device 22 comprises a plurality of separate interfaces. In one implementation, user interface 18 comprises at least one interface that is provided integrally with processor 16 and/or electronic storage 20.

It is to be understood that other communication techniques, either hard-wired or wireless, are also contemplated by the present disclosure as user interface 18 and/or the user interface included in remote computing device 22. For example, the present disclosure contemplates that user interface 18 and/or the user interface included in remote computing device 22 may be integrated with a cellular and/or wireless (Wi-Fi) connection. In some implementations, user interface 18 and/or the user interface included in remote computing device 22 may be included in a removable storage interface provided by electronic storage 20 (although this implementation may not be as scalable as integration with a cellular and/or wireless connection). In these examples, information may be loaded into system 10 wirelessly from a remote location, from removable storage (e.g., a smart card, a flash drive, a removable disk, etc.), and/or other sources that enable the user(s) to customize the implementation of system 10. Other exemplary input devices and techniques adapted for use with system 10 as user interface 18 comprise, but are not limited to, an RS-232 port, RF link, an IR link, modem (telephone, cable, and/or other modems), a cellular network, a Wi-Fi network, a local area network, and/or other devices and/or systems. In short, any technique for communicating information with system 10 is contemplated by the present disclosure as user interface 18 and/or the user interface included in remote computing device 22.

Electronic storage 20 may comprise electronic storage media that electronically stores information. The electronic storage media of electronic storage 20 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 20 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 20 may store software algorithms, recorded video event data, information determined by processor 16, information received via user interface 18, and/or other information that enables system 10 to function properly. Electronic storage 20 may be (in whole or in part) a separate component within system 10, or electronic storage 20 may be provided (in whole or in part) integrally with one or more other components of system 10 (e.g., user interface 18, processor 16, etc.).

Remote computing device 22 may include one or more processors, a user interface, electronic storage, and/or other components. Remote computing device 22 may be configured to enable a user to interface with system 10 (e.g., as described above), and/or provide other functionality attributed herein to remote computing device 22. Remote computing device 22 may be configured to communicate with processor 16 via a network such as the internet, cellular network, Wi-Fi network, Ethernet, and other interconnected computer networks. Remote computing device 22 may facilitate viewing and/or analysis of the information conveyed by the output signals of sensors 14, the information determined by processor 16, the information stored by electronic storage 20, and/or other information. By way of non-limiting example, remote computing device 22 may include one or more of a server, a server cluster, desktop computer, a laptop computer, a handheld computer, a tablet computing platform, a NetBook, a Smartphone, a gaming console, and/or other computing platforms.

In some implementations, remote computing device 22 may be and/or include a server. The server may include communication lines, or ports to enable the exchange of information with a network, processor 16 of system 10, and/or other computing platforms. The server may include a plurality of processors, electronic storage, hardware, software, and/or firmware components operating together to provide the functionality attributed herein to remote computing device 22. For example, the server may be implemented by a cloud of computing platforms operating together as a system server.

As described above, processor 16 may be configured to provide information processing capabilities in system 10. As such, processor 16 may comprise one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may comprise a plurality of processing units. These processing units may be physically located within the same device (e.g., a vehicle event recorder), or processor 16 may represent processing functionality of a plurality of devices operating in coordination.

Processor 16 may be configured to execute modules 30, 32, 34, and/or 36 by software; hardware; firmware; some combination of software, hardware, and/or firmware; and/or other mechanisms for configuring processing capabilities on processor 16. It should be appreciated that although modules 30, 32, 34, and 36 are illustrated in FIG. 1 as being co-located within a single processing unit, in implementations in which processor 16 comprises multiple processing units, one or more of modules 30, 32, 34, and/or 36 may be located remotely from the other modules. The description of the functionality provided by the different modules 30, 32, 34, and/or 36 described herein is for illustrative purposes, and is not intended to be limiting, as any of modules 30, 32, 34, and/or 36 may provide more or less functionality than is described. For example, one or more of modules 30, 32, 34, and/or 36 may be eliminated, and some or all of its functionality may be provided by other modules 30, 32, 34, and/or 36. As another example, processor 16 may be configured to execute one or more additional modules that may perform some or all of the functionality attributed below to one of modules 30, 32, 34, and/or 36.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method to detect execution of driving maneuvers based on pre-determined driving maneuver profiles, the method comprising:

generating output signals from two or more sensors conveying information related to operation and/or context of a vehicle;

determining one or more vehicles parameters based on the output signals, the one or more vehicle parameters being related to the operation and/or context of the vehicle;

obtaining one or more pre-determined driving maneuver profiles, the one or more pre-determined driving maneuver profiles including criteria sets associated with driving maneuvers, the one or more pre-determined driving maneuver profiles including a first pre-determined driving maneuver profile having a first criteria set, the first criteria set including a first individual criterion and a second individual criterion, wherein the first individual criterion and the second individual criterion for the first pre-determined driving maneuver profile are associated with information conveyed by the output signals from the two or more different sensors;

detecting, in real-time or near real-time, execution by the vehicle of a specific driving maneuver, the specific driving maneuver detected based on the determined vehicle parameters and the obtained pre-determined driving maneuver profiles by comparing the determined vehicle parameters to the criteria sets such that a first specific driving maneuver is detected responsive to the determined parameters satisfying the first individual criterion and the second individual criterion; and facilitating, in real-time or near real-time, responsive to the detection of the specific driving maneuver, wireless communication to a remote computing device of the information conveyed by the output signals for a period of time that includes at least the specific driving maneuver.

2. The method of claim 1, wherein the one or more driving maneuvers include one or more of a U-turn, freewheeling, over-revving, lane-departure, short following, imminent collision, a sustained left turn indicating a potential overturn on a cloverleaf, or a sustained right turn indicating a potential overturn on a cloverleaf.

3. The method of claim 1, further comprising:

scaling the first individual criterion and/or the second individual criterion in the first pre-determined driving maneuver profile based on the output signals and/or the determined parameters.

4. The method of claim 3, wherein the scaling is performed in real-time or near real-time during operation of the vehicle.

5. The method of claim 1, wherein the two or more different sensors include a sensor configured to generate output signals conveying information related to one or more of mechanical systems of the vehicle, movement of the vehicle, an orientation of the vehicle, a geographic position of the vehicle, or a spatial position of the vehicle relative to other objects.

6. The method of claim 1, wherein determining the one or more vehicle parameters is performed one or more times in an ongoing manner during operation of the vehicle.

7. A method to detect execution of driving maneuvers for multiple vehicles, the method comprising:
generating, by a first set of sensors, output signals conveying first information related to operation and/or context of a first vehicle;
generating, by a second set of sensors, output signals conveying second information related to operation and/or context of a second vehicle;
detecting, in real-time or near real-time, execution by the first vehicle of a first driving maneuver from a first set of driving maneuvers, wherein detection is based on the first information;
detecting, in real-time or near real-time, execution by the second vehicle of a second driving maneuver from a second set of driving maneuvers, wherein detection is based on the second information;
generating, by the first vehicle, a first event record based on the first information for a first period of time that includes at least the first driving maneuver;
generating, by the second vehicle, a second event record based on the second information for a second period of time that includes at least the second driving maneuver;
facilitating, in real-time or near real-time, and responsive to detection of the first driving maneuver, wireless communication to a remote computing device of the first event record;
facilitating, in real-time or near real-time, and responsive to detection of the second driving maneuver, wireless communication to the remote computing device of the second event record; and
displaying, on the remote computing device, indications of the first driving maneuver and the second driving maneuver.

8. The method of claim 7, wherein the first set of driving maneuvers includes imminent collision.

9. The method of claim 8, wherein the first set of driving maneuvers further includes a swerve.

10. The method of claim 1, wherein the first set of driving maneuvers further includes a sustained turn indicating a potential overturn.

11. The method of claim 1, further comprising:
capturing, by a first video camera, first video images related to a first environment in and/or around the first vehicle; and
capturing, by a second video camera, second video images related to a second environment in and/or around the second vehicle;
wherein the first event record is further based on the first video images, and
wherein the second event record is further based on the second video images.

12. A system configured to detect execution of driving maneuvers based on predetermined driving maneuver profiles, the system configured to couple with a vehicle, the system comprising:
two or more different sensors configured to generate output signals conveying information related to operation and/or context of the vehicle; and
one or more processors configured to execute computer program modules, the computer program modules comprising:
a parameter module configured to determine one or more vehicle parameters based on the output signals, the one or more vehicle parameters being related to the operation and/or context of the vehicle;
a profile module configured to obtain one or more pre-determined driving maneuver profiles that describe one or more driving maneuvers executed by the vehicle, the one or more pre-determined driving maneuver profiles including criteria sets associated with driving maneuvers, the one or more predetermined driving maneuver profiles including a first pre-determined driving maneuver profile having a first criteria set, the first criteria set including a first individual criterion and a second individual criterion;
a maneuver trigger module configured to detect execution by the vehicle of a specific driving maneuver, the specific driving maneuver detected based on the determined vehicle parameters and the obtained pre-determined driving maneuver profiles by comparing the determined vehicle parameters to the criteria sets such that a first specific driving maneuver is detected responsive to the determined parameters satisfying the first individual criterion and/or the second individual criterion, wherein the first individual criterion and the second individual criterion for the first predetermined driving maneuver profile are associated with information conveyed by the output signals from the two or more different sensors and
a control module configured to, responsive to the detection of the specific driving maneuver, facilitate, in real-time or near real-time, wireless communication of the information conveyed by the output signals for a period of time that includes at least the specific driving maneuver to a remote computing device.

13. The system of claim 12, wherein the one or more driving maneuvers include one or more of a U-turn, free-wheeling, over-revving, lane-departure, short following, imminent collision, a sustained left turn indicating a potential overturn on a cloverleaf, or a sustained right turn indicating a potential overturn on a cloverleaf.

14. The system of claim 12, wherein the profile module is further configured to scale the first individual criterion and/or the second individual criterion in the first pre-determined driving maneuver profile based on the output signals and/or the determined parameters.

15. The system of claim 14, wherein the profile module is configured to perform the scaling in real-time or near real-time during operation of the vehicle.

16. The system of claim 12, wherein the two or more different sensors include a sensor configured to generate output signals conveying information related to one or more of mechanical systems of the vehicle, movement of the vehicle, an orientation of the vehicle, a geographic position of the vehicle, or a spatial position of the vehicle relative to other objects.

17. The system of claim 12, wherein the parameter module is configured to determine the one or more vehicle parameters one or more times in an ongoing manner during operation of the vehicle.

18. The system of claim 12, wherein the two of more different sensors include a video camera configured to capture video images related to an environment in and/or around the vehicle.

19. The system of claim 12, wherein the control module is configured such that the period of time that includes at least the specific driving maneuver includes a pre-maneuver period of time and a post-maneuver period of time.

20. The system of claim 19, wherein the control module is configured such that the pre-maneuver period of time and the post-maneuver period of time are determined after detection of the specific driving maneuver, and the pre-maneuver period of time is determined based on the detected specific driving maneuver, and the post-maneuver period of a time is determined based on the detected specific driving maneuver.

21. The method of claim 1, wherein the two of more different sensors include a video camera that captures video images related to an environment in and/or around the vehicle.

22. The method of claim 1, wherein the control module is configured such that the period of time that includes at least the specific driving maneuver includes a pre-maneuver period of time and a post-maneuver period of time.

23. The method of claim 1, wherein detecting execution of the specific driving maneuver is performed such that the pre-maneuver period of time and the post-maneuver period of time are determined after detection of the specific driving maneuver, and the pre-maneuver period of time is determined based on the detected specific driving maneuver, and the post-maneuver period of a time is determined based on the detected specific driving maneuver.

* * * * *